(12) United States Patent
Rey

(10) Patent No.: US 9,729,364 B1
(45) Date of Patent: Aug. 8, 2017

(54) FREQUENCY SHIFT KEYING (FSK) DEMODULATOR AND METHOD THEREFOR

(71) Applicant: FREESCALE SEMICONDUCTOR, INC., Austin, TX (US)

(72) Inventor: Claudio Rey, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/194,608

(22) Filed: Jun. 28, 2016

(51) Int. Cl.
    *H04L 27/156* (2006.01)
    *H04L 27/16* (2006.01)

(52) U.S. Cl.
    CPC ............ *H04L 27/156* (2013.01); *H04L 27/16* (2013.01)

(58) Field of Classification Search
    CPC .............................. H04L 27/156; H04L 27/16
    See application file for complete search history.

(56) References Cited

U.S. PATENT DOCUMENTS

| | | | |
|---|---|---|---|
| 4,027,264 A | 5/1977 | Gutleber | |
| 6,002,725 A * | 12/1999 | Razzell | H04L 27/1563 329/300 |
| 7,397,300 B2 * | 7/2008 | Quinlan | H04L 27/156 329/300 |
| 7,746,812 B2 | 6/2010 | Bhukania | |
| 8,023,917 B2 | 9/2011 | Popescu | |
| 8,259,862 B2 | 9/2012 | Peng et al. | |
| 8,519,784 B2 | 8/2013 | Hafuka | |
| 2005/0137815 A1* | 6/2005 | Quinlan | H04L 27/156 702/75 |
| 2010/0080112 A1 | 4/2010 | Bertrand et al. | |
| 2010/0177857 A1 | 7/2010 | Huttunen et al. | |
| 2014/0023164 A1* | 1/2014 | Oh | H04L 27/14 375/334 |

OTHER PUBLICATIONS

Non-Final Rejection on U.S. Appl. No. 15/283,473, Jan. 17, 2017, 12 pages.
Notice of Allowance in U.S. Appl. No. 15/283,473, dated Jun. 27, 2017, 15 pages.

* cited by examiner

*Primary Examiner* — Freshteh N Aghdam

(57) ABSTRACT

A frequency shift keying (FSK) demodulator for demodulating symbols includes correlation circuits configured to output correlation metrics based on a buffered portion of an input signal as the input signal is continuously received by the FSK demodulator. The FSK demodulator also includes a result combining stage configured to output a set of first correlation results based on correlation metrics generated for a first portion of the input signal encoding a current symbol and at least one past symbol, and a set of second correlation results based on correlation metrics generated for a second portion of the input signal encoding the current symbol and at least one next symbol; and a time combining stage configured to combine a set of delayed first correlation results with the set of second correlation results to produce a demodulation decision that returns a most likely symbol value for the current symbol.

20 Claims, 14 Drawing Sheets

FREQUENCY SHIFT KEYING (FSK) DEMODULATOR AND METHOD THEREFOR

BACKGROUND

Field

This disclosure relates generally to demodulating binary information, and more specifically to demodulating frequency shift keying (FSK) signals.

Related Art

When transmitting data between devices, the data must be transformed into a suitable signal form for being transmitted via the communication link between the devices, whether the link is a wired communication link or a wireless link. For wireless communication, transmission of data includes inserting the data to be transmitted onto a carrier signal (also referred to as modulating the data) for transmission over a wireless link, while receipt of data includes extracting the received data from the carrier signal (also referred to as demodulating the data).

BRIEF DESCRIPTION OF THE DRAWINGS

The present invention may be better understood, and its numerous objects, features, and advantages made apparent to those skilled in the art by referencing the accompanying drawings.

The present invention is illustrated by way of example and is not limited by the accompanying figures, in which like references indicate similar elements, unless otherwise noted.

Elements in the figures are illustrated for simplicity and clarity and have not necessarily been drawn to scale. The number N is used throughout the Figures to indicate an integer number of components, and the number N need not be the same number for the components.

DETAILED DESCRIPTION

Figure 1:
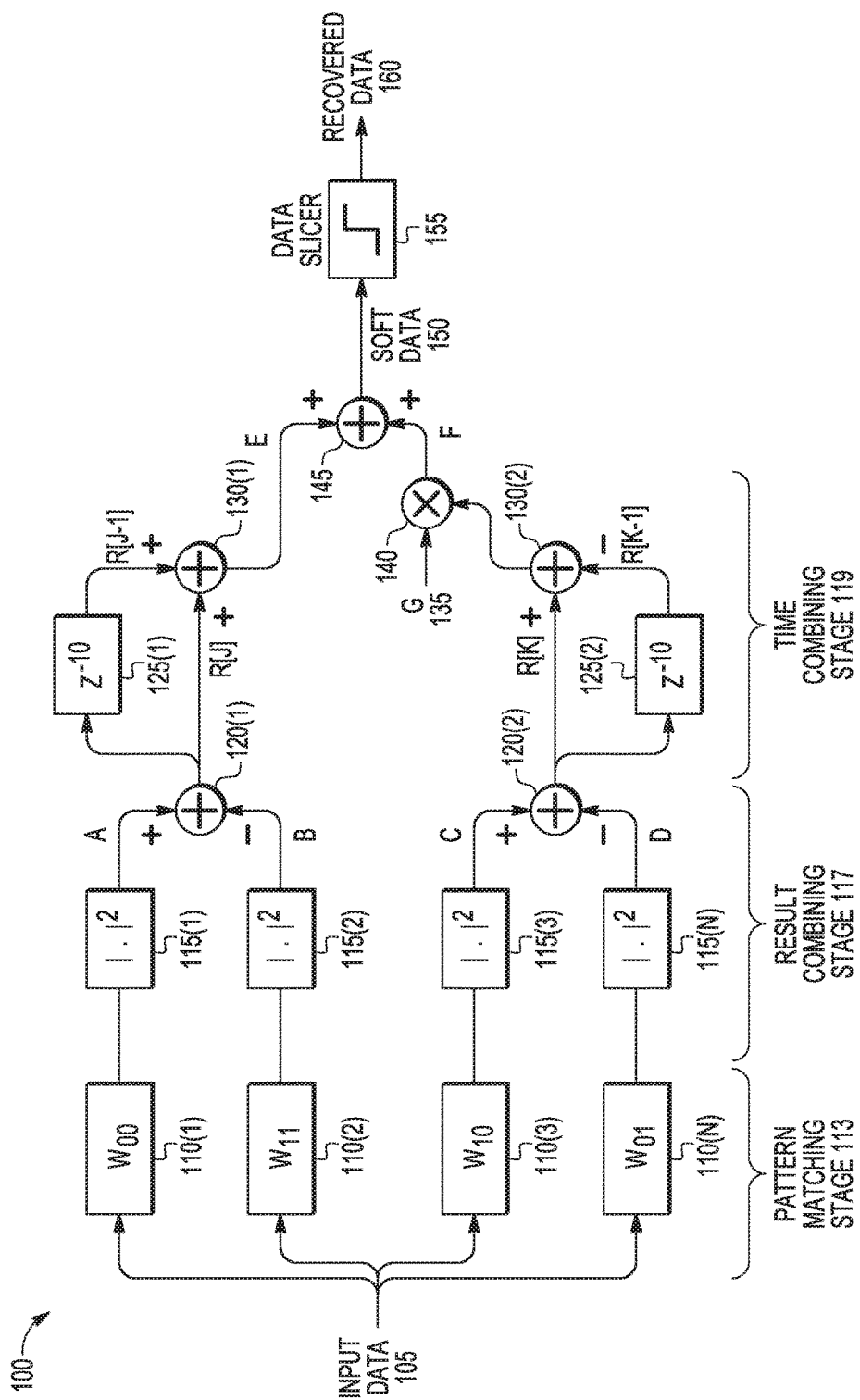
FIG. 1 illustrates a block diagram depicting an example demodulator in which the disclosure is implemented, according to some embodiments.

The following sets forth a detailed description of various embodiments intended to be illustrative of the invention and should not be taken to be limiting.

Overview

Modulation and demodulation schemes are often defined in standards associated with particular wireless communication technologies. In frequency modulation approaches, for example, changes in the frequency of a transmitted signal are used to communicate information. For transmissions made in accordance with the IEEE 802.15.1 standard or BLUETOOTH standard, techniques such as frequency shift keying (FSK) are used to modulate and demodulate transmitted data signals.

In frequency shift keying (FSK) modulation schemes, a particular carrier frequency is defined. For example, the carrier frequency Fc of BLUETOOTH communications (e.g., BLUETOOTH Low Energy or BLE transmission) may be around 2.4 gigahertz (GHz). For 2-FSK (or two level FSK), a data value of '1' is then represented by the transmission of an analog pulse having a symbol frequency that exceeds the carrier frequency by some frequency deviation (also referred to as a positive frequency F1). Conversely, a data value of '0' is represented by the transmission of an analog pulse having a symbol frequency that is less than the carrier frequency by some frequency deviation (also referred to as a negative frequency −F1). In some embodiments, the frequency deviation of the positive frequency F1 away from the carrier frequency Fc is the same in magnitude as the frequency deviation of the negative frequency −F1 away from the carrier frequency Fc (where the carrier frequency is centered between frequencies F1 and −F1). The frequency deviation may be within a range of 10 kilohertz (kHz) to 250 kHz. It is noted that the difference between the frequencies F1 and −F1 is referred to as the frequency shift. It is also noted that FSK modulation schemes may or may not filter the phase. For example, BLE uses Gaussian filtering and its filter is configured to have a BT (or BT product, where B is bandwidth of the filter and T is symbol duration) of 0.5 and a frequency deviation of 250 kHz. FSK modulation may be used around 2.4 GHz, but is also commonly used in sub-GHz frequencies with deviation from a few Hertz to half a MHz or beyond. Other FSK modulations use other forms of filtering such as raised cosine filtering or no filtering at all.

Different FSK techniques can be used to modulate different amounts of digital data. As noted above, in 2-FSK (or two level FSK) systems, two symbol frequencies are defined (e.g., −F1 and F1) where each frequency represents a different one of the following data values: 0 and 1. In 4-FSK (or four level FSK) systems, four symbol frequencies (e.g., −F2, −F1, F1, F2, also referred to as F0, F1, F2, and F3) are defined where each frequency represents a different one of the following data values: 00, 01, 10, and 11, where a second (larger) frequency deviation is used to define a second positive frequency F2 and a second negative frequency −F2 from the carrier frequency. In this manner, 8-FSK, 16-FSK, and the like can be implemented to transmit varying amounts of data represented by different symbol frequencies.

During transmission and receipt of the FSK modulated data signal, the data signal may suffer from intersymbol interference, or distortion in which one symbol interferes with one or more neighboring symbols. Common causes of intersymbol interference include multipath propagation and filter bandwidths. The distortion caused by intersymbol interference often makes proper detection of symbols at a receiver difficult since the transition between symbols is affected (e.g., neighboring symbols affect each other or "blur" into one another).

The present disclosure provides a contextual demodulator configured to make demodulation decisions based on pattern correlation results generated based on an input signal, such as correlation results between the input signal and target frequency behavior patterns, or correlation results between the input signal and target signals that encode patterns of reference symbols. The contextual demodulator evaluates portions of the input data signal and generates previous correlation results and future correlation results, which provide context for making a present decision for a current symbol encoded in an FSK modulated input data signal. The previous correlation results are based on a portion of the input data signal that encodes a current symbol and one or more preceding (or past) symbols, and the future correlation results are based on a portion of the input data signal that encodes the current symbol and one or more following (or next) symbols. Since each encoded symbol affects one or more subsequently received symbols, the correlation results generated by the contextual demodulator are combined in a time-wise manner, where the previous correlation results reinforce the future correlation results.

Each future and previous correlation result has a magnitude (or a magnitude squared) that indicates a likelihood of the current symbol being a particular symbol value, such as '0' or '1' in a 2-FSK embodiment, or '0', '1', '2', or '3' in a 4-FSK embodiment. The strength (e.g., weak or strong) of the likelihood is dependent on the size of the correlation result's magnitude. For example, a previous and a future correlation result may each strongly indicate a same symbol value for the current symbol, where the combined correlation result has a larger magnitude than the individual previous and future correlation results, indicating a greater likelihood or probability of the current symbol having the same symbol value. Thus, the previous and future correlation results are reinforcing. In another example, one of the previous and future correlation results may weakly indicate one symbol value, and the other of the previous and future correlation results may strongly indicate another symbol value. Such previous and future correlation results are still reinforcing, although the combination of the previous and future correlation results produces a combined correlation result having a magnitude reflecting a difference between the previous and future correlation results, which indicates the likelihood of the current symbol having the strongly indicated symbol value. A present demodulation decision is generated based on the combination of previous and future correlation results, where the demodulation decision returns the most likely symbol value as the current symbol.

In some embodiments, the contextual demodulator implements behavior matching principles. In other embodiments, the contextual demodulator implements maximum likelihood principles (e.g., a best estimation with the least possible number of errors). While other known demodulators may utilize maximum likelihood sequence estimation (MLSE) or Viterbi algorithm, such demodulators carry a large computation burden. By contrast, the present contextual demodulator achieves a lower computational burden than a conventional MLSE demodulator or conventional Viterbi demodulator while obtaining an optimal sequence, due to the disclosed time-wise combination of previous and future correlation results with respect to the symbol being decided upon. The time-wise combination also conveniently provides further information that the contextual demodulator uses to track changes over time. In particular, one approach uses coherent summation of complex correlation values, which also indicates that the phase is slowly changing over time, allowing the contextual demodulator to track such drift.

This time-wise combination implemented by the contextual demodulator also minimizes complexity of the contextual demodulator to achieve a less expensive demodulator (as compared to higher end MLSE or Viterbi demodulators), while also providing improved signal sensitivity and more accurate decisions produced by the contextual demodulator. For example, as compared with approaches that base decisions on a single symbol or using discriminators, the contextual demodulator offers an improvement of 1.5 to 4.4 dB (decibels) at small frequency offsets, while more than 5 dB at large frequency offsets (e.g., around 300 kHz). The contextual demodulator may be configured for demodulating FSK modulated data signals, such as 2-, 4-, 8-, or other modulo-2 FSK-modulated signals, as indicated by the modulation schemes implemented for BLUETOOTH Low Energy (BLE) protocol, ANT protocol, other protocols that meet the IEEE 804.15.4 wireless standard, and the like.

Example Embodiments

Figure 10:
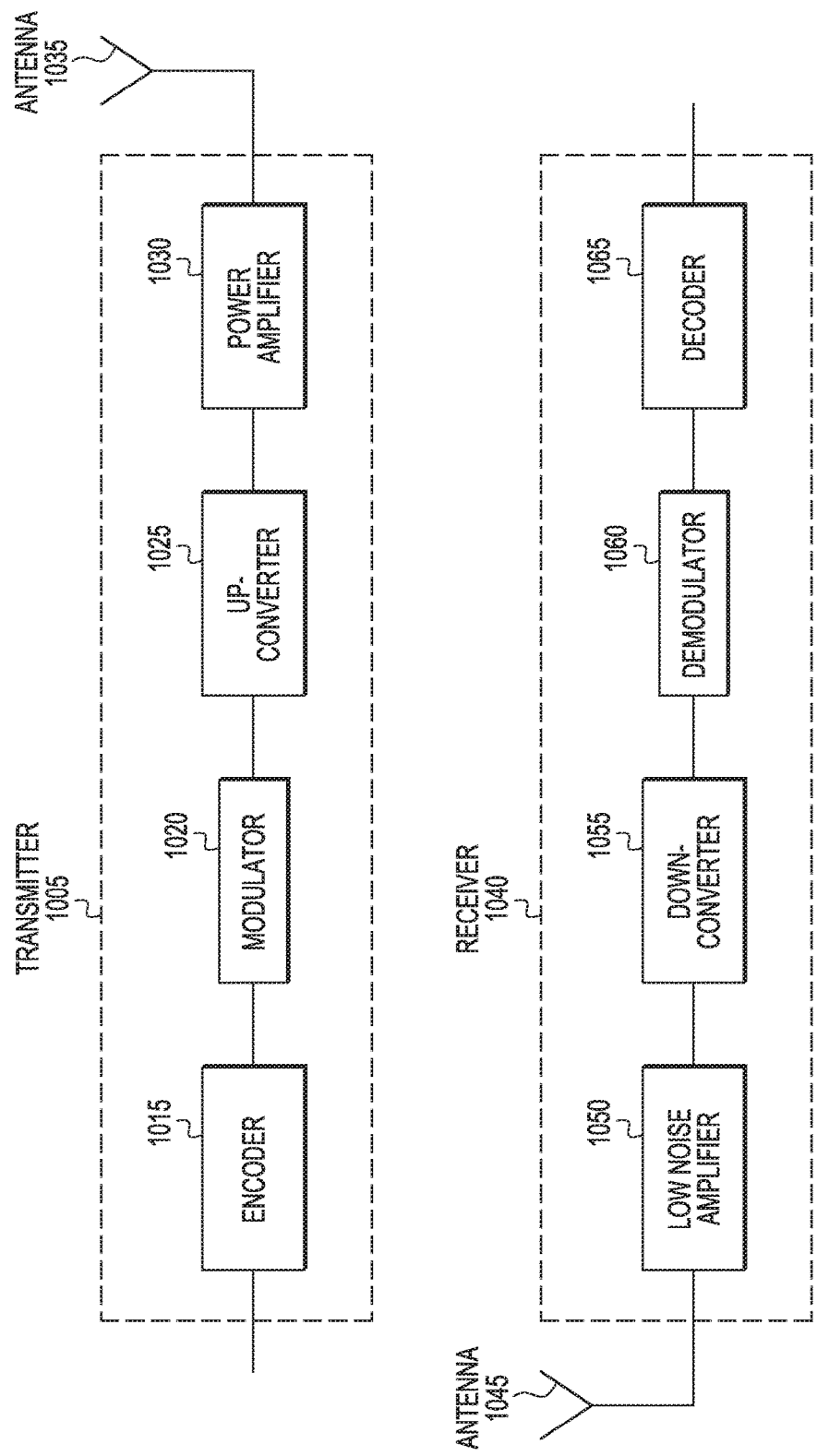
FIG. 10 illustrates a block diagram of example transmitter and receiver systems utilized for data transmission, according to some embodiments.

The contextual FSK (frequency shift keying) demodulator discussed herein may be included in a receiver system or combination transmitter and receiver system (or transceiver system) used for communicating data. Elements typically used for communicating digital data between two devices are illustrated in FIG. 10, which shows an example transmitter system 1005 and an example receiver system 1040 (where both systems 1005 and 1040 may be included in a transceiver system). Transmitter system 1005 includes an encoder 1015, a modulator 1020, an up-converter 1025, a power amplifier 1030, and an antenna 1035. Receiver system 1040 includes an antenna 1045, a low noise amplifier (LNA) 1050, a down converter 1055, a contextual demodulator 1060 like that discussed below in connection with FIG. 1 (or FIG. 4, FIG. 5, or FIG. 12), and a decoder 1065. Other elements may also be included in transmitter 1005 and receiver 1040.

During operation of transmitter 1005, digital data to be transmitted to receiver 1040 of a receiving device is provided to encoder 1015. Encoder 1015 is configured to encode the digital data into a form suitable for modulation by modulator 1020. For example, encoder 1015 may implement a voice or image codec that translates the digital data into a binary data stream. In some embodiments, encoder 1015 is also configured to implement an error correction scheme to transform the binary data stream into a form suitable for detecting channel errors that may occur during data transmission, such as by adding redundancy bits to the binary data stream.

The output of encoder 1015 is provided to modulator 1020, which is configured to implement an FSK modulation scheme (such as 2-FSK or 4-FSK and the like, as noted above) for converting the binary data stream into an analog signal form suitable for transmission to receiver 1040, such as on a wireless medium. In some embodiments, the modulator 1020 (and demodulator 1060) implement a non-coherent FSK modulation scheme. Modulator 1020 is configured to translate bits of the binary data stream into a stream of data symbols, where a data symbol S is an analog pulse waveform having a frequency (e.g., in baseband) and persisting for a duration of time, also referred to as symbol duration time period T. It is noted that the phrase "symbol duration period T" used herein generally indicates the amount of time represented by the symbol duration time period T, while the phrase "symbol time period T" used herein generally indicates a particular instance of the symbol duration time period T. The modulation scheme defines a set of symbols and a set of frequencies, where each symbol represents one or more bits and each symbol itself is represented by a corresponding frequency, also referred to herein as a symbol frequency. In some embodiments, modulator 1020 may include a voltage controlled oscillator (VCO) that is controlled to generate an analog pulse (persisting for symbol duration period T) at the various symbol frequencies, in order to produce an analog signal encoded with data symbols at a known data symbol rate, where the data symbols correspond to the binary data stream.

The output of modulator 1020 is provided to up-converter 1025, which is configured to translate the analog signal (e.g., in baseband) to the radio frequency in which bandwidth has been allocated for the transmission. The output of up-converter 1025 is provided to power amplifier 1030, which amplifies the power of the analog signal to a sufficient amount to transmit the analog signal to receiver 1040 via antenna 1035.

At the receiver 1040, a radio frequency (RF) analog signal is received at antenna 1045 and is provided to LNA 1050, which is configured to amplify the RF signal. This amplification step can be useful as the RF signal may have been attenuated through the transmission of the signal from one device to another. The RF signal is therefore enhanced in LNA 1050 such that it is at a level suitable for further handling by the remaining elements of receiver 1040. The output of LNA 1050 is provided to down converter 1055, which is configured to convert the analog signal from its allocated transmission bandwidth to a predetermined bandwidth (e.g., in baseband).

The output of down converter 1055 is provided to contextual demodulator 1060, which is configured to implement an FSK demodulation scheme that is counterpart to the FSK modulation scheme implemented in modulator 1020. Examples of demodulator 1060 include demodulators 100, 400, 500, and 1200, as further discussed below. Demodulator 1060 is configured to recover data symbols from the analog signal, as also further discussed below. In some embodiments, demodulator 1060 also includes a translation circuit configured to convert each recovered data symbol into its corresponding bits (e.g., in embodiments where each data symbol represents two or more bits), in order to produce the corresponding binary data stream. The output of demodulator 1060 is provided to decoder 1065, which is also configured to detect and correct errors of the binary data stream according to the error correction scheme also utilized by encoder 1015. Decoder 1065 may also be configured to remove redundancy bits from the binary data stream. Decoder 1065 is also configured to decode the binary data stream into digital data, as counterpart to the format utilized by encoder 1015.

Demodulator 1060 is configured to receive an input data signal (such as the analog signal provided by down converter 1055 of FIG. 10), which potentially contains an FSK-modulated data signal encoded with one or more data symbols. The input data signal has a known data symbol rate at which the data symbols have been encoded into the input signal, where each data symbol represents one or more bits. For example, the input data signal may have a data symbol rate equivalent to a 1 mega bits per second (mbps) data rate. The data symbol rate may translate to a different data bit rate (e.g., less than the data symbol rate), depending on the modulation scheme utilized to modulate the signal, the error correction scheme utilized, and the quality of signal reception.

Among other components, contextual demodulator 1060 includes a number of correlators, where each correlator is configured to identify and recover a received analog signal (such as a signal encoded with data symbols) in the presence of noise. Each correlator receives the input data signal and processes the signal at a particular rate, referred to as the oversampling rate. As used herein, the oversampling rate is the ratio of the sample rate at the receiver demodulator over the symbol rate, where the symbol rate is the rate at which the original symbols were generated. In some embodiments, the oversampling ratio is 8 samples per symbol, while the oversampling ratio is 4 samples per symbol in other embodiments. Other oversampling ratios may be utilized in other embodiments. Examples of demodulator 1060 are further discussed below, in connection with FIGS. 1, 4, 5, and 12.

Figure 11:
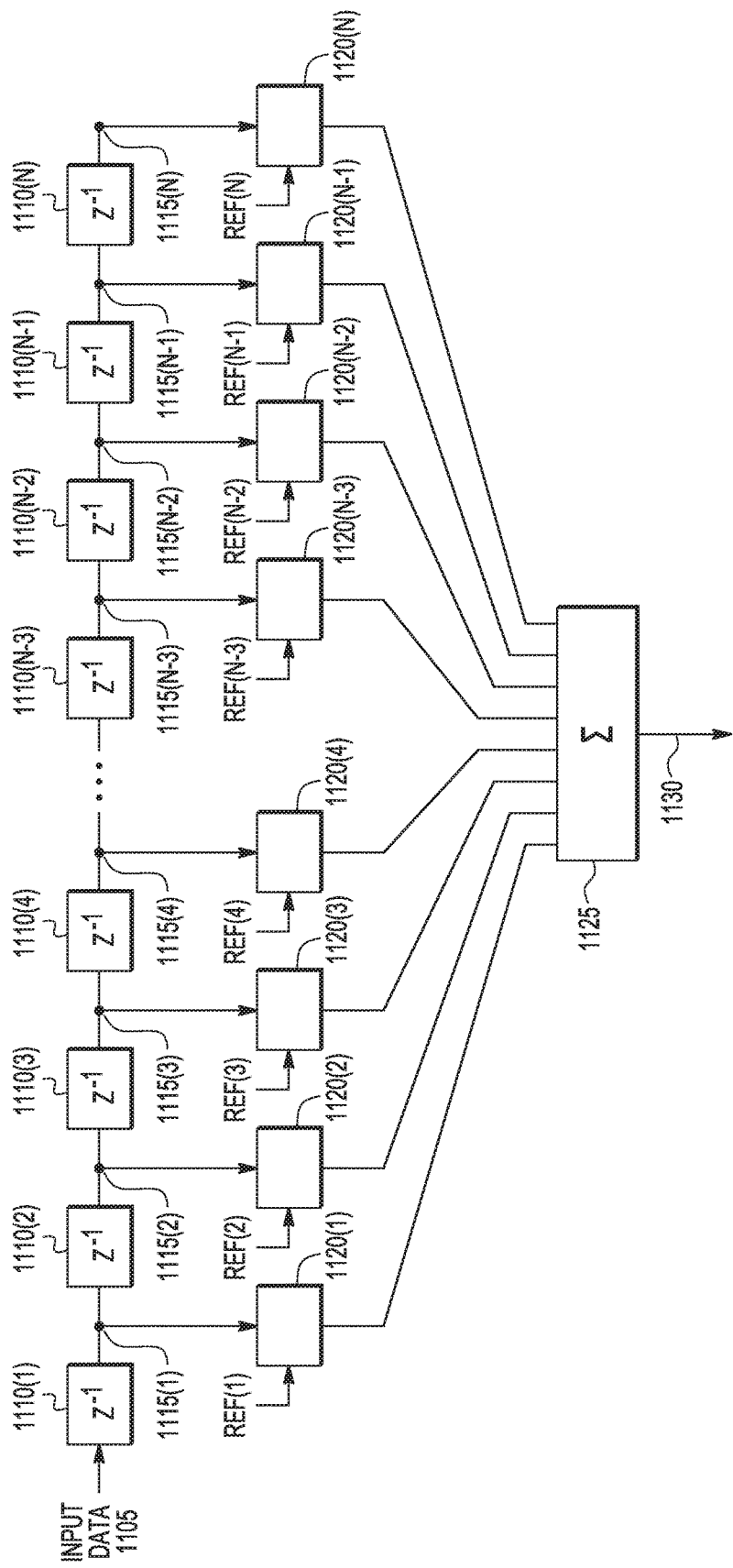
FIG. 11 illustrates a block diagram of an example correlator utilized in a demodulator like that shown in either FIG. 1, 4 or 5, according to some embodiments.

FIG. 11 illustrates an example correlator 1100 utilized in demodulator 1060 (examples of which include demodulators 100, 400, 500, and 1200, as further discussed below), which includes a number of unit delay blocks 1110(1)-(N) coupled in series, a number of sample nodes 1115(1)-(N), and a number of taps 1120(1)-(N). The output of each unit delay block 1110 is coupled to a respective sample node 1115. Each tap 1120 has one input connected to a respective sample node 1115 and another input connected to a respective reference waveform (also referred to as a target signal) sample value, also referred to as tap reference value REF, further discussed below. The oversampling ratio (at least partially) determines the N number of delay blocks 1110, sample nodes 1115, taps 1120, and corresponding tap reference values implemented in each correlator 1100. Each unit delay block 1110 provides an amount of delay (or unit of delay, as indicated by the z value of −1) equal to the symbol duration period T divided by the oversampling ratio.

The unit delay blocks 110(1)-(N) buffer or store the input data signal 1105 as the input data signal 1105 is continuously received by demodulator 1060. As the input data signal 1105 is received by demodulator 1060, the input data signal 1105 is shown as passing through the unit delay blocks 1110(1)-(N) of correlator 1100 from left to right in FIG. 11 to show receipt order of the input data signal. In some embodiments, correlator 1100 may be viewed as including an input shift register. The unit delay blocks 1110(1)-(N) store a most recently received portion of the input data signal 1105, also referred to as a buffered portion of the input data signal. Each tap 1120 regularly or periodically samples the buffered portion of the input data signal 1105 at sample nodes 1115(1)-(N), where each tap 1120 operates with respect to a different point in time. Taps 1120(1)-(N) are configured to sample the buffered portion at a periodically repeating sample time, where the time period between the repeating sample times has a duration of at least one symbol duration period T. In some embodiments, it is preferred that the time period between repeating sample times has a duration of 1 and ¼ symbol duration period T.

It is noted that throughout the present disclosure, the following definitions are used: a current symbol Sc is a portion of the input data signal received during a current symbol time period Tc, a previous symbol Sp is a portion of the input data signal received immediately before the current symbol Sc during a previous symbol time period Tp, and a next symbol Sn is a portion of the input data signal received immediately after the current symbol Sc during a next symbol time period Tn, where the symbol time periods Tc, Tp, and Tn are a same symbol duration time T (or time during which the respective symbol persists). Also, X and Y used herein indicate a "don't care" state (such for FIG. 9) and represent either 0 or 1, or may represent a larger sequence of symbols.

In some embodiments, the N number of components (e.g., delay blocks, taps, sample nodes) implemented in correlator 1100 is equal to the number of symbols to be sampled multiplied by the oversampling ratio. In the embodiments discussed herein, each correlator 1100 includes enough taps 1120(1)-(N) to oversample a portion of the input data signal 1105 that encodes two consecutive symbols, current symbol Sc and previous symbol Sp. In other embodiments, enough taps for three or more consecutive symbol portions may be implemented.

For example, if an oversampling ratio of 4 samples per symbol is implemented, correlator 1100 would include a total of at least 8 taps that sample the input data signal 1105 over two consecutive symbol time periods, with taps 1120(1)-(4) sampling a portion of input data signal 1105 that encodes current symbol Sc and taps 1120(N-3)-(N) sampling a portion of input data signal 1105 that encodes previous symbol Sp. When a next portion of the input data signal 1105 that encodes a next symbol Sn is received, taps 1120(1)-(4) sample a portion of input data signal 1105 that encodes the next symbol Sn and taps 1120(N-3)-(N) sample a portion of input data signal 1105 that encodes the current symbol Sc. As another example, if an oversampling ratio of 8 samples per symbol is implemented, correlator 1100 would include a total of at least 16 taps that sample the input data signal 1105 over two consecutive symbol periods, with taps 1120(1)-(8) sampling a current symbol Sc portion of input data signal and taps 1120(N-7)-(N) sampling a previous symbol Sp portion of input data signal. When the next symbol portion Sn is received, taps 1120(1)-(8) sample the next symbol Sn portion of input data signal and taps 1120(N-7)-(N) sample the current symbol Sc portion of input data signal. If correlator 1100 samples the input data signal 1105 over three or more symbol time periods at a time, the symbol portions of the input data signal 1105 (such as Sn, Sc, and Sp) are similarly sampled consecutively by taps 1120 as the input data signal 1105 passes through the correlator 1100.

Each tap 1120 samples the input data signal 1105 at respective node 1115 and multiplies the data sample with the tap's reference value REF. The value of the tap's reference value REF is based on whether the correlator 1100 is configured to perform symbol pattern matching (e.g., implemented in the demodulator of FIG. 4, FIG. 5, and FIG. 12) or behavior pattern matching (e.g., implemented in the demodulator of FIG. 1). The outputs of the taps 1120(1)-(N) are then added together by summing block 1125 to generate a correlation signal having a magnitude at output 1130 of the correlator 1100. The correlation signal is normalized so that the signal power of the correlation signal can be used as a metric that indicates correlation strength, where the correlation metric is proportional to how closely the buffered portion of the input data signal 1105 correlates to (or matches) a target signal encoding a reference sequence of symbols (for symbol pattern matching) or a target frequency behavior pattern (for behavior pattern matching), as further discussed below. The target signal (or reference waveform) accounts for various characteristics of the input data signal that are used to make a good correlation to or match with the input data signal, such as frequency deviation, behavior of pulse shaping in the phase, and combined analog/digital filtering in the I/O domain. A high or large correlation metric is produced at output 1130 when the values of the data samples detected at each of the correlator's taps 1120(1)-(N) match the corresponding tap reference values REF(1)-(N), indicating the target signal or target behavior pattern has likely been detected (e.g., strong correlation). Otherwise, a low or small correlation metric is produced at output 1130, indicating the target signal or target behavior pattern has not likely been detected (e.g., weak correlation).

For symbol pattern matching, the tap reference values REF(1)-(N) represent a target signal or waveform (W) encoding a reference sequence of two or more data symbols that the correlator 1100 is configured to detect. For example, in FIGS. 4 and 5, four correlators are implemented in a 2-FSK embodiment, where each correlator detects one of four possible target signals that encode a current reference symbol RSc (first or leftmost digit) and a previous reference symbol RSp (second or rightmost digit): 00, 01, 10, and 11. The target signals are respectively indicated as W00, W01, W10, and W11, having the order W[RSc][RSp]. In other words, correlator 1100 is configured to detect whether the frequencies of the input data signal 1105 over two or more symbol time periods match the symbol frequencies of a sequence of reference symbols. In some embodiments where an oversampling ratio of 4 samples per symbol is implemented, tap reference values REF(1)-(4) may correspond to a current reference symbol RSc and tap reference values REF(N-3)-(N) may correspond to the previous reference symbol RSp. In other embodiments where an oversampling ratio of 8 samples per symbol is implemented, tap reference values REF(1)-(8) may correspond to a current reference symbol RSc and tap reference values REF(N-7)-(N) may correspond to the previous reference symbol RSp. In some embodiments, the tap reference values REF(1)-(N) provided to taps 1120(1)-(N) are samples of a sampled version of a target signal that encodes a reference sequence of two or more data symbols, where each REF sample is similarly delayed according to the tap's position. In other embodiments, tap reference values REF( )(N) are coefficients or integer values that correspond to digital values sampled from the target signal and similarly delayed according to the tap's position, where the taps 1120(1)-(N) also receive digital values sampled from the input data signal 1105 respectively from nodes 1115(1)-(N).

For behavior pattern matching, the tap reference values REF(1)-(N) represent a target behavior pattern over the sampling period that the correlator 1100 is configured to detect. For example, in FIG. 1, four correlators are implemented in a 2-FSK embodiment, where each correlator detects one of four possible target behavior patterns that are each associated with a transition from a previous frequency during a previous symbol time period Tp (second or rightmost digit) to a current frequency during a current symbol time period Tc (first or leftmost digit): transitioning from a positive frequency to a negative frequency (10), transitioning from a negative frequency to a positive frequency (01), transitioning from a positive frequency to a positive frequency (00), and transitioning from a negative frequency to a negative frequency (11). The target patterns are respectively indicated as W00, W01, W10, and W11, having the order W[Tc][Tp]. In other words, the correlator 1100 is configured to detect whether the frequency of the input data signal 1105 exhibits behavior that matches a reference behavior pattern, rather than detect whether the data symbol frequencies themselves match reference symbol frequencies. Behavior pattern matching is especially beneficial when the signal received by correlator 1100 is distorted from noise or intersymbol interference, since an overall trend of the frequency is being evaluated rather than attempting to determine whether the frequency of the noisy signal matches a specific positive or negative frequency.

In an example correlator 1100 configured to perform behavior pattern matching, if correlator 1100 is configured to detect behavior W00, taps 1120(1)-(N) are configured to detect whether the frequency of input data signal 1105 is positive (or greater than the carrier frequency) over both a current symbol time period Tc and a previous symbol time period Tp. If correlator 1100 is configured to detect behavior W01 (or a negative frequency transitioning to a positive frequency), taps 1120(1)-(4) are configured to detect whether the input data signal has a positive frequency (or a frequency greater than the carrier frequency) over the current symbol time period Tc and taps 1120(N−3)-(N) are configured to detect whether the input data signal has a negative frequency (or a frequency less than the carrier frequency) over the previous symbol time period Tp. In other embodiments, if correlator 1100 is configured to detect behavior W01, taps 1120(1)-(N) are configured to detect whether the frequency of the input data signal is increasing, such as from a negative frequency during the previous symbol time period Tp to a positive frequency during the current symbol time period Tc. Similarly, if correlator 1100 is configure to detect behavior W10, taps 1120(1)-(N) are configured to detect whether the frequency of the input data signal is decreasing, such as from a positive frequency during the previous symbol time period Tp to a negative frequency during the current symbol time period Tc.

The embodiments of correlator 1100 discussed above produce a correlation signal having a magnitude proportional to the likelihood or probability of detecting a matching input data signal, where the signal power of such correlation signals are summed or otherwise combined by the demodulators discussed below (such as in FIGS. 1, 4, 5, 12, and 13), which are also referred to demodulators performing power combining. Another embodiment of correlator 1100 is utilized in demodulators performing vector combing, such as that discussed below in connection with FIG. 14. Such a correlator 1100 is configured to receive real and imaginary components that together provide a complex domain representation of the input data signal 1105, such as an in-phase and quadrature (I/Q) representation of the input data signal 1105. Such embodiments of correlator 1100 may be implemented as a matched filter, which correlates the input data signal 1105 (which can be viewed as a vector) with a filter kernel representing the target signal (which can be viewed as another vector) that is parallel with the input data signal, which results in a complex correlation value (which can also be viewed as a vector) having a magnitude component and a phase component, where the magnitude component indicates a likelihood of target signal detection. A complex correlation value having a large or high magnitude indicates the target signal has likely been detected, while a complex correlation value having a small or low magnitude indicates the target signal has not likely been detected. Using a matched filter maximizes the signal-to-noise power ratio at its output for the input data signal, while minimizing the probability of undetected errors. Accordingly, the correlator 1100 produces complex correlation value information for the input data signal 1105 when utilized for vector combining.

Behavior Matching Approach

FIG. 1 illustrates a block diagram depicting an example demodulator 100 for 2-FSK, which may be included in a receiver system or combination transmitter and receiver system (or transceiver system) like that shown in FIG. 10. Demodulator 100 includes correlators 110(1)-(N), squaring blocks 115(1)-(N), adder blocks 120(1)-(N), 130(1)-(N), and 145, delay blocks 125(1)-(N), multiplier block 140, and data slicer 155. The correlators 110(1)-(N) form a pattern matching stage 113, the squaring blocks 115(1)-(N) and adder blocks 120(1) and 120(2) form a result combining stage 117, and delay blocks 125(1)-(2), adder blocks 130(1) and 130(2), multiplier block 140, and adder block 145 form a time combining stage 119. While the squaring blocks 115 are shown as being included in result combining stage 117, they may also be included in pattern matching stage 113 in other embodiments. It is noted that a correlator 110 in combination with a squaring block 115 may be referred to herein as correlation circuit. It is also noted that correlators 110(1)-(N) of pattern matching stage 113 are configured to perform behavior pattern matching, as further described above in connection with FIG. 11. These components are further discussed below.

Figure 2:
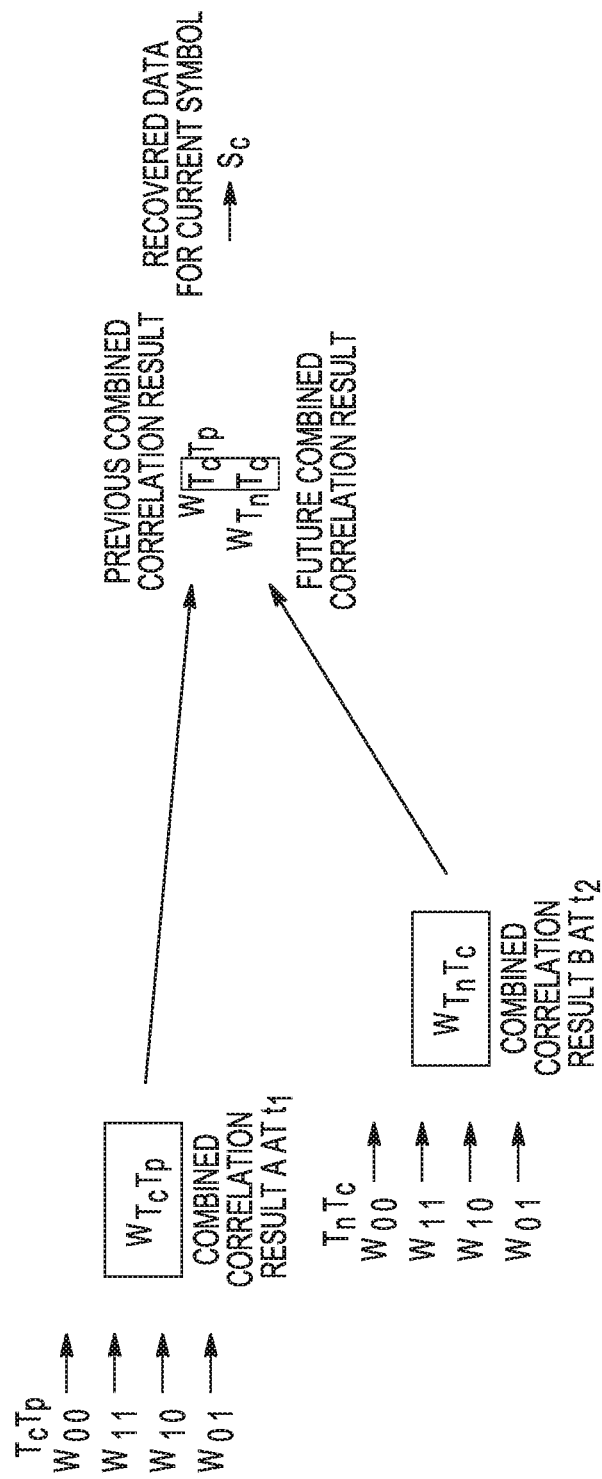
FIG. 2 illustrates a block diagram of an example demodulation decision made by the demodulator of FIG. 1, according to some embodiments.

Demodulator 100 is configured to produce demodulation decisions, an example of which is illustrated in FIG. 2. Correlators 110(1)-(N) (illustrated in FIG. 2 as W00, W11, W10, and W01) are configured to sequentially sample a buffered portion of the input data signal 105 over a sampling period spanning at least two symbol time periods (or 2T). Correlators 110(1)-(N) are also configured to output correlation signals that, when combined by the demodulator 100 using power combining as described below, produce a demodulation decision for the value of the current symbol Sc based on frequency behavior patterns detected over Tn, Tc, and Tp portions of the input data signal, where the demodulation decision returns the most likely symbol value for the current symbol Sc, which is either '0' or '1'.

On the left side of FIG. 2, correlators W00, W11, W10, and W01 each sample the input data signal over Tc and Tp and output correlation signals indicating a likelihood of whether the frequency over the Tc and Tp portions of the input data signal matches the correlator's respective frequency behavior pattern. The signal power of those signals (used as correlation metrics, as described below) are combined by the demodulator and represented as a combined correlation result A (or simply "result A") made at time t1 in the top branch of FIG. 2. When correlators receive a next Tn portion of the input data signal 105, the correlators sample the input data signal 105 over Tn and Tc and output correlation signals that indicate a likelihood of whether the frequency over the Tn and Tc portions of the input data signal matches the correlator's respective frequency behavior pattern. The signal power of those signals are combined by the demodulator and represented as a combined correlation result B (or simply "result B") made at time t2 in the bottom branch of FIG. 2, where time t2 is at least one symbol time period T after time t1. Result A is stored (or delayed) until result B is made in order to align the results for proper combination for the current symbol, which is overlapped by both results. Since result A is based in part on past symbol time period Tp, result A is considered a "previous" result A. Similarly, since result B is based in part on next symbol time period Tn, result B is considered a "future" result B. Previous result A is added with future result B to produce an overall combined result (e.g., soft data) having a magnitude that indicates the most likely symbol value of the current symbol Sc. The most likely symbol value (as indicated by the combined result) is returned as the demodulation decision.

The previous and future results A and B each indicate a likelihood (e.g., strong or weak) of whether the current symbol value is '0' or '1'. The previous and future results A and B are cumulative, where the previous result reinforces the future result. For example, if the previous and future results both indicate a likelihood of a same symbol value for Sc, the previous and future results have a common sign (either positive or negative, based on the power combining) and the magnitudes of the previous and future results are additive to result in a combined result having a larger magnitude that confirms the indicated symbol value for Sc. If the previous and future results indicate likelihoods of different symbol values for Sc, the previous and future results have differing signs and the magnitudes of the previous and future results are subtractive, where the overall combined result depends on the result that has the larger magnitude. For example, if one result (previous or future) has a small magnitude that weakly indicates a '0' and the other result (future or previous) has a large magnitude that strongly indicates a '1', the '1' is determined to be the most likely current symbol value.

Figure 9:
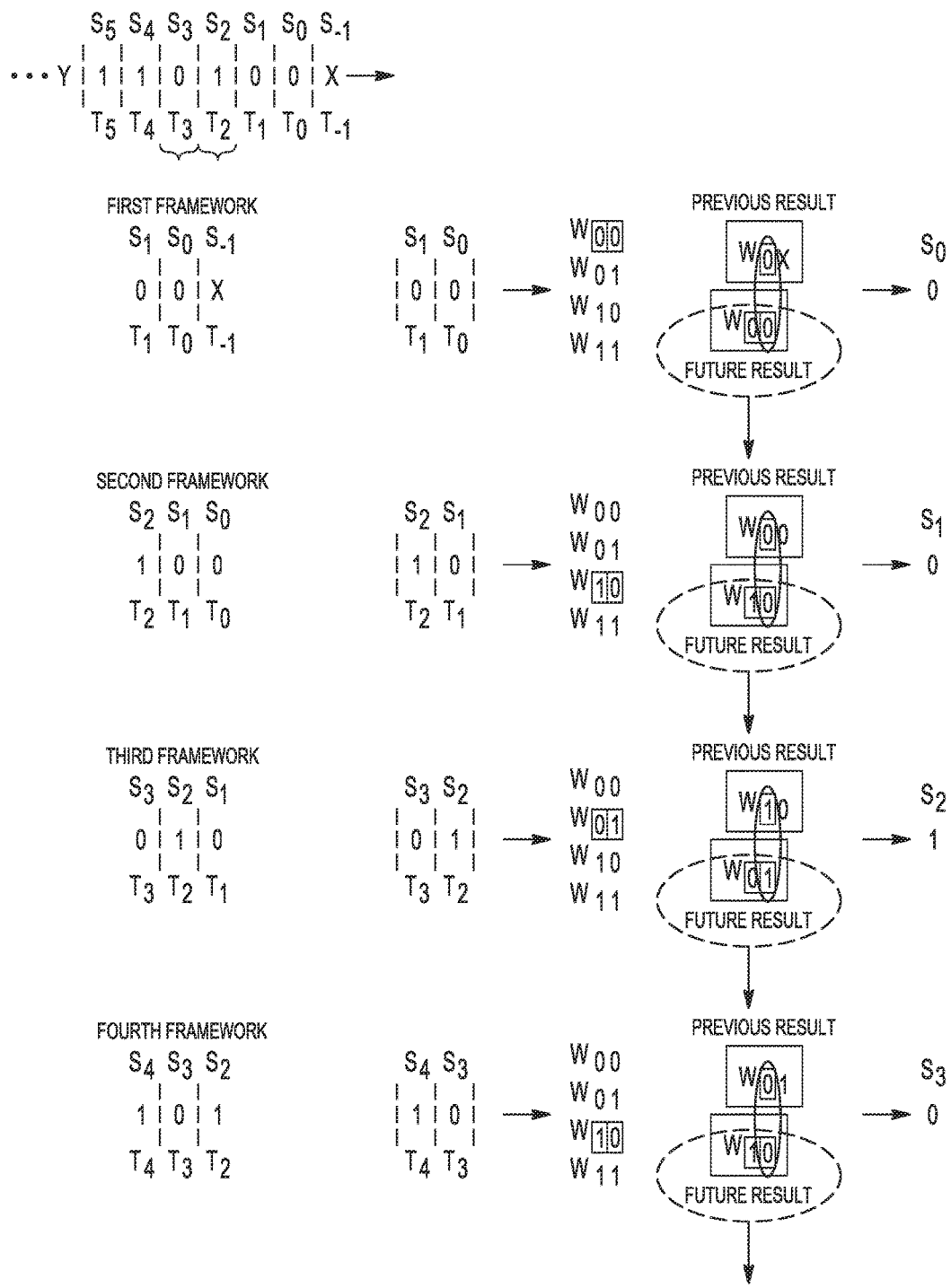
FIG. 9 illustrates a block diagram depicting an example demodulation process implemented by a demodulator like that shown in either FIG. 1, 4, or 5, according to some embodiments.

It is also noted that the correlators' sampling of the buffered portion of the input data signal over time periods Tc and Tp is referred to herein as a first sampling iteration at a first sample time t1, and the correlators' sampling of the buffered portion of the input data signal over time periods Tn and Tc is referred to herein as a second sampling iteration at a second sample time t2. Together, these two iterations of the correlators' sampling process form a framework on which a demodulation decision for Sc is based, where this framework moves or shifts on each sampling iteration to align Tn with the most recently received portion of the input data signal for a subsequent demodulation decision. FIG. 9 illustrates the movement of this framework as an example input data signal encoding a sequence of symbols S0-S5 (e.g., X001011Y) over a respective one of time periods T0-T5 is received by demodulator 100. The order of the sequence is illustrated from right to left to show receipt time order (or the order in which the demodulator 100 receives the signal).

A first demodulation decision based on a first framework is illustrated near the top of FIG. 9, with the framework shown on the left side and the demodulation decision shown on the right side. Each framework is viewed as including Tn, Tc, and Tp, where first framework includes the T1 portion of the signal being equivalent to Tn, the T0 portion of the signal being equivalent to Tc, and the T[−1] portion of the signal being equivalent to Tp. For the first demodulation decision, correlators (sequentially) receive the T[−1] and T0 portions of the signal and perform a first sampling iteration once receipt of the T0 portion is complete, resulting in a previous combined correlation result (W0X) based on Tc and Tp (or T0 and T[−1]). Correlators then receive the next T1 portion of the signal and a second sampling iteration is performed on the T0 and T1 portions of the signal once receipt of the T1 portion is complete, resulting in a future combined correlation result (W00) based on Tn and Tc (or T1 and T0). The previous and future combined correlation results are added (shown as an oval with a solid line), as discussed above, resulting in a present demodulation decision that returns the most likely symbol value for the current symbol S0 based on T1, T0, and T[−1] (shown as '0').

The framework shifts on receipt of the next T2 portion of the signal, illustrated in the next row of FIG. 9. The second framework includes the T2 portion of the signal being equivalent to Tn, the T1 portion of the signal being equivalent to Tc, and the T0 portion of the signal being equivalent to Tp. The future combined correlation result from the first framework is stored for a symbol duration period T and becomes the previous combined correlation result for the second framework (shown as an oval with a dashed line carrying the result over to the next framework by the arrow) based on Tc and Tp (or T1 and T0). Correlators perform another sampling iteration for the T2 and T1 portions of the signal, and a future combined correlation result is made (W10) based on Tn and Tc (or T2 and T1). The previous combined correlation result (W00) and the future combined correlation result (W10) are added and a demodulation decision is generated that returns the most likely symbol value for the current symbol S1 based on T2, T1, and T0 portions of the signal ('0'). The framework shifts again on receipt of the next T3 portion of the signal, and the process repeats, as also shown in the remaining rows of FIG. 9.

Returning to FIG. 1, demodulator 100 is configured to receive an input data signal 105 (such as the analog signal provided by down converter 1055 of FIG. 10), which potentially contains an FSK-modulated data signal encoded with one or more data symbols. Input data signal 105 has a known data symbol rate at which the data symbols have been encoded into the input signal, where each data symbol represents one or more bits. As discussed above, each correlator 110 is configured to identify and recover a received analog signal (such as a signal encoded with data symbols) in the presence of noise. Each correlator 110 receives the input data signal 105, processes the signal at the oversampling rate, and outputs a correlation signal having a correlation value or magnitude that indicates whether a target behavior pattern is detected.

Correlator 110(1) is configured to detect whether the buffered portion of the input data signal 105 exhibits behavior pattern W00 or, in other words, maintains a positive frequency over two consecutive time periods (such as over Tc and Tp during a first sampling iteration, or over Tn and Tc during a second sampling iteration). Correlator 110(2) is configured to detect whether the buffered portion of the input data signal 105 exhibits behavior pattern W11 or, in other words, maintains a negative frequency over two consecutive time periods (such as over Tc and Tp during a first sampling iteration, or over Tn and Tc during a second sampling iteration). Accordingly, correlators 110(1) and 110(2) form a branch configured to determine whether the frequency of the buffered portion of the input data signal 105 does not change.

Correlator 110(3) is configured to detect whether the buffered portion of the input data signal 105 exhibits behavior pattern W10 or, in other words, transitions from a positive frequency to a negative frequency over two consecutive time periods (such as transitioning from Tp to Tc during a first sampling iteration, or transitioning from Tc to Tn during a second sampling iteration). Correlator 110(4) is configured to detect whether the buffered portion of the input data signal 105 exhibits behavior pattern W01 or, in other words, transitions from a negative frequency to a positive frequency over two consecutive time periods (such as transitioning from Tp to Tc during a first sampling iteration, or transitioning from Tc to Tn during a second sampling iteration). Accordingly, correlators 110(3) and 110(4) form a branch configured to detect whether the frequency of the buffered portion of the input data signal 105 changes.

The output of each correlator 110 (also shown as output 1130 of FIG. 11) is coupled to a respective squaring block 115 that is configured to output the absolute square of the correlation signal (or the signal power of the correlation signal) to produce a correlation metric. In other embodiments, each correlator 110 has an output coupled to a respective absolute value block 115 configured to output the absolute value (without squaring the absolute value) of the correlation value or magnitude to produce the correlation metric. The magnitude of each correlation metric at the output of blocks 115(1)-(N) indicates a correlation or likelihood of a matching relationship between a received portion of the input data signal 105 and the target behavior pattern that each correlator is configured to detect. The correlation metrics are normalized and also indicate the likelihood of a symbol value for a current symbol Sc, based on the detected frequency pattern.

In result combining stage 117, the correlation metrics outputted by squaring blocks 115(1) and 115(2) (shown respectively as correlation metrics A and B) are added or summed by adder block 120(1), which outputs a correlation result R[J] based on non-transitioning frequencies detected during two consecutive time periods (such as Tc and Tp for a first sampling iteration, or Tn and Tc for a second sampling iteration). Adder block 120(1) outputs the difference between the magnitudes of A and B, which indicates the likelihood of the buffered portion of the input data signal matching either behavior W00 or W11. For example, if A is larger than B (indicating a greater likelihood that the input data signal exhibits behavior W00), then the output of adder block 120(1) is a positive value, where the magnitude of that positive value corresponds to the likelihood of the current symbol value being '0' (e.g., small positive value indicates weak likelihood, large positive value indicates strong likelihood). If B is larger than A (indicating a greater likelihood that the input data signal exhibits behavior W11), then the output of adder block 120(1) is a negative value, where the magnitude of that negative value corresponds to the likelihood of the current symbol value being '1'.

The outputs of squaring blocks 115(3) and 115(N) (shown respectively as correlation metrics C and D) are added or summed by adder block 120(2), which outputs a correlation result R[K] based on transitioning frequencies detected during two consecutive time periods (such as Tc and Tp for a first sampling iteration, or Tn and Tc for a second sampling iteration). Adder block 120(2) outputs the difference between the magnitudes of C and D, which indicates the likelihood of the buffered portion of the input data signal matching either behavior W10 or W01. For example, if C is larger than D (indicating a greater likelihood that the input data signal exhibits behavior W10), then the output of adder block 120(2) is a positive value, where the magnitude corresponds to the likelihood of the current symbol value being '0'. If D is larger than C (indicating a greater likelihood that the input data signal exhibits behavior W01), then the output of adder block 120(2) is a negative value, where the magnitude corresponds to the likelihood of the current symbol value being '1'.

In time combining stage 119, a set of future correlation results (including R[J] and R[K]) are combined with a set of previous correlation results (including R[J−1] and R[K−1], as discussed below) to produce a demodulation decision. It is noted that in the discussion of FIG. 2, previous combined correlation result A is equivalent to the combination of the set of previous correlation results (including R[J−1] and R[K−1]), and future combined correlation result B is equivalent to the combination of the set of future correlation results (including R[J] and R[K]).

The result R[J] output by adder block 120(1) is passed to both a delay block 125(1) and to adder block 130(1). Delay block 125(1) stores the result R[J] (which is based on Tc and Tp for a first sampling iteration) for at least the duration of a symbol duration period T to become a delayed result DR[J]. When a next portion of the input data signal 105 is received, a subsequent result R[J] (which is based on Tn and Tc for a second sampling iteration) is output by adder block 120(1). Since the subsequent result R[J] is based at least in part on Tn, the subsequent result R[J] is also referred to as a future result R[J]. Delayed result DR[J] is based at least in part on Tp and is also referred to as a previous result R[J−1], where [J−1] indicates that the previous result was generated at a time previous to when future result R[J] was generated (i.e., by at least a symbol time period T). Previous result R[J−1] is stored until future result R[J] is output in order to align the combination of previous and future results, which indicate the likelihood of some symbol value for the current symbol based on Tn, Tc, and Tp.

In the embodiment shown, correlators 110(1)-(N) are configured to take 8 samples per symbol (and each includes 8 units of delay per symbol duration period T), where the delay block 125(1) is configured to store the result R[J] for one and one quarter symbols, or output the delayed result DR[J] after 10 units of delay (as indicated by the z value of −10), although other units of delay and other oversampling ratios may be utilized in other embodiments.

Adder block 130(1) adds or sums future result R[J] output from adder block 120(1) with previous result R[J−1] output from delay block 125(1), where the previous result R[J−1] reinforces the future result R[J]. The sign of the future result R[J] indicates whether either a current symbol value of '0' (positive) or '1' (negative) and the magnitude of the future result R[J] corresponds to the correlation strength or likelihood of that current symbol value. The output of adder block 130(1), also referred to as a first combined result, is provided to adder block 145.

The result R[K] output by adder block 120(2) is passed to both a delay block 125(2) and to adder block 130(2) of time combining stage 119. Delay block 125(2) stores the result R[K] (which is based on Tc and Tp for a first sampling iteration) for at least a symbol duration period T to become a delayed result DR[K], which is equivalent to a previous result R[K−1]. When a next portion of the input data signal 105 is received, a subsequent result R[K] (which is based on Tn and Tc for a second sampling iteration) is output by adder block 120(2), which is equivalent to a future result R[K]. Adder block 130(2) outputs the difference between future result R[K] output from adder block 120(2) with previous result R[K−1] output from delay block 125(2)]. The difference of R[K] and R[K−1] is taken in order to cancel out detection errors. For example, a large W01 correlation metric generated during a first sampling iteration (indicating that the pattern W01 was detected for Tc and Tp) should not again be generated during a second sampling iteration (indicating that the pattern W01 was detected for Tn and Tc), since such generation indicates a conflict for Tc having both a positive and a negative frequency detected. Similarly, a large W10 correlation metric should not be received twice in a row. If either the W01 or W10 metrics are received twice in a row, one iteration of the metric is delayed and output as previous R[K−1] and the other iteration of the metric is output as future R[K], and their magnitudes cancel each other out at adder block 130(2). Otherwise, large W01 and W10 metrics are likely alternately (and properly) received and the corresponding correlation metrics become additive to confirm proper receipt (e.g., a delayed W10 metric having a positive sign is subtracted from a future W01 metric having a negative sign, resulting in a combined metric having a negative sign that confirms a negative frequency for Tc and that '1' is the likely symbol value for the current symbol Sc).

The output of adder block 130(2), also referred to as a second combined result, is provided to multiplier block 140, which multiplies the output of adder block 130(2) by a gain factor G. Since the input data signal 105 includes noise, correlators 110(3) and 110(4) may detect false frequency transitions. In order to minimize noise influence, a gain factor G 135 is used to scale down the second combined result. The value of the gain factor G is dependent upon the modulation implementation. An example value for gain factor G for BLUETOOTH (e.g., BLUETOOTH low energy application) is 0.6 or 0.625. A different gain factor G may be used for ANT applications, in other embodiments. The scaled output of multiplier block 140 is provided to adder block 145.

The first combined result output from adder block 130(1) and the scaled second combined result output from multiplier block 140 are shown respectively as results E and F. As shown in FIG. 1, adder block 145 adds or sums the results E and F to produce soft data 150, or a value that indicates a most likely symbol value for the current symbol, based on a detection of frequency behavior of the input data signal 105 over time periods Tn, Tc, and Tp. The sign of the soft data value 150 indicates a current symbol value of '0' (if positive) or '1' (if negative). While this embodiment indicates a particular mapping of soft data value 150 to the current symbol value, other mappings may be used in other embodiments (such as a current symbol value of '1' if positive, or '0' if negative), depending on how correlation metrics and correlation results are added in the demodulator. The soft data value 150 is provided to data slicer 115, which outputs recovered data 160 based on the sign of the soft data 150. For example, if the soft data 150 is positive, data slicer 155 outputs a data value (or bit in 2-FSK) of '0'. If the soft data 150 is negative, data slicer 155 outputs a data value (or bit in 2-FSK) of '1'. Each original data symbol can thus be recovered from the received analog input data signal 105.

Figure 3:
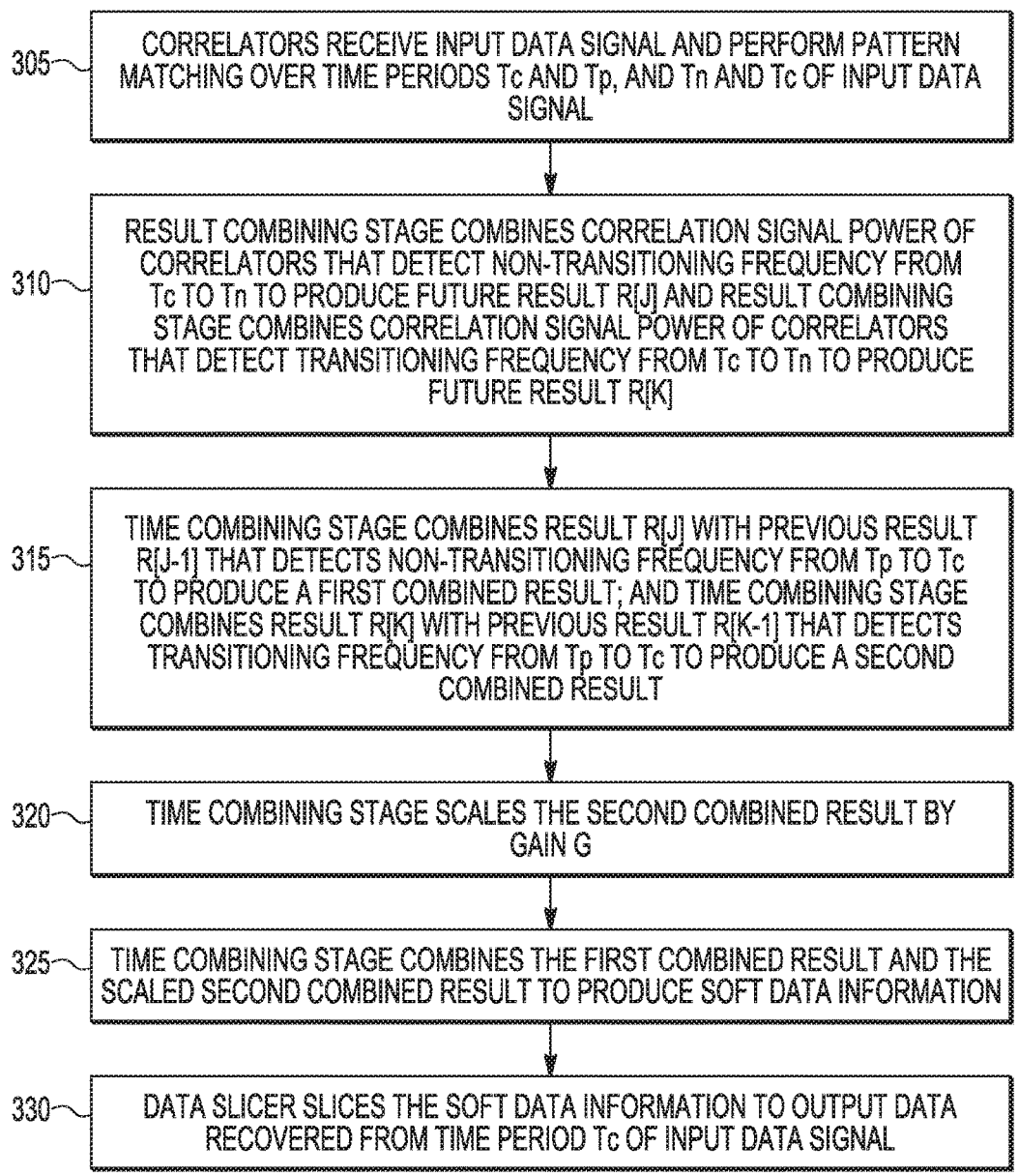
FIG. 3 illustrates a flowchart depicting an example demodulation process implemented by the demodulator of FIG. 1, according to some embodiments.

FIG. 3 illustrates a flowchart depicting an example demodulation process implemented by the demodulator 100 of FIG. 1. The demodulation process begins at operation 305, where correlators 110(1)-(N) are configured to receive the input data signal and perform pattern matching over a sampling period spanning at least two symbol time periods (or 2T). Correlators output correlation signals, where the signal power of such signals are combined into correlation results, as discussed above. The correlation results corresponding to time periods Tc and Tp (e.g., for a first sampling iteration) are stored by delay blocks 125(1) and 125(2) for at least a symbol duration period T to become previous results R[J−1] and R[K−1] utilized in operation 315 below. Correlation results corresponding to time periods Tn and Tc (e.g., for a second sampling iteration) are provided as future results R[J] and R[K] utilized in operation 310 below. The previous and future results each indicate a likelihood of a symbol value for a current symbol. It is noted that the remaining operations of the process illustrated in FIG. 3 are performed in view of the second sampling iteration (for Tn and Tc).

The process continues to operation 310, where one branch of result combining stage (e.g., adder block 120(1)) combines correlation signal power of correlators (e.g., 110(1) and 110(2)) that detect a non-transitioning frequency from Tc to Tn to produce future result R[J]. Another branch of result combining stage (e.g., adder block 120(2)) also combines correlation signal power of correlators (e.g., 110(3) and 110(4)) that detect a transitioning frequency from Tc to Tn to produce future result R[K].

The process continues to operation 315, where a branch of time combining stage (e.g., adder block 130(1)) combines future result R[J] with previous result R[J−1] that detects a non-transitioning frequency from Tp to Tc to produce a first combined result. Another branch of time combining stage (e.g., adder block 130(2)) also combines future result R[K] with previous result R[K−1] that detects a transitioning frequency from Tp to Tc to produce a second combined result.

The process continues to operation 320, where the time combining stage (e.g., multiplier block 140) scales the second combined result by gain G. The process continues to operation 325, where the branches of time combining stage are joined (e.g., adder block 145) and combine the first combined result with the scaled second combined result to produce soft data information that indicates the most likely symbol value for the current symbol. The process continues to operation 330, where data slicer "slices" the soft data information, or determines an output based on the sign of the soft data information inputted to data slicer, where the data slicer outputs data recovered from the time period Tc of the input data signal.

The process of FIG. 3 repeats for each subsequently received portion of the input data signal. For example, for a subsequent iteration of the process illustrated in FIG. 3, the process returns to operation 310, where the correlators receive a subsequently received portion of the input data signal and the framework shifts to align Tn with the most recently received portion of the input data signal (or the buffered portion of the input data signal). Correlators then perform pattern matching over realigned Tn and Tc. Also, results R[J] and R[K] produced in the first iteration of operation 310 are stored by the time combining stage to produce previous results R[J−1] and R[K−1] that are used in the subsequent iteration of operation 315.

Symbol Matching Approach

Figure 4:
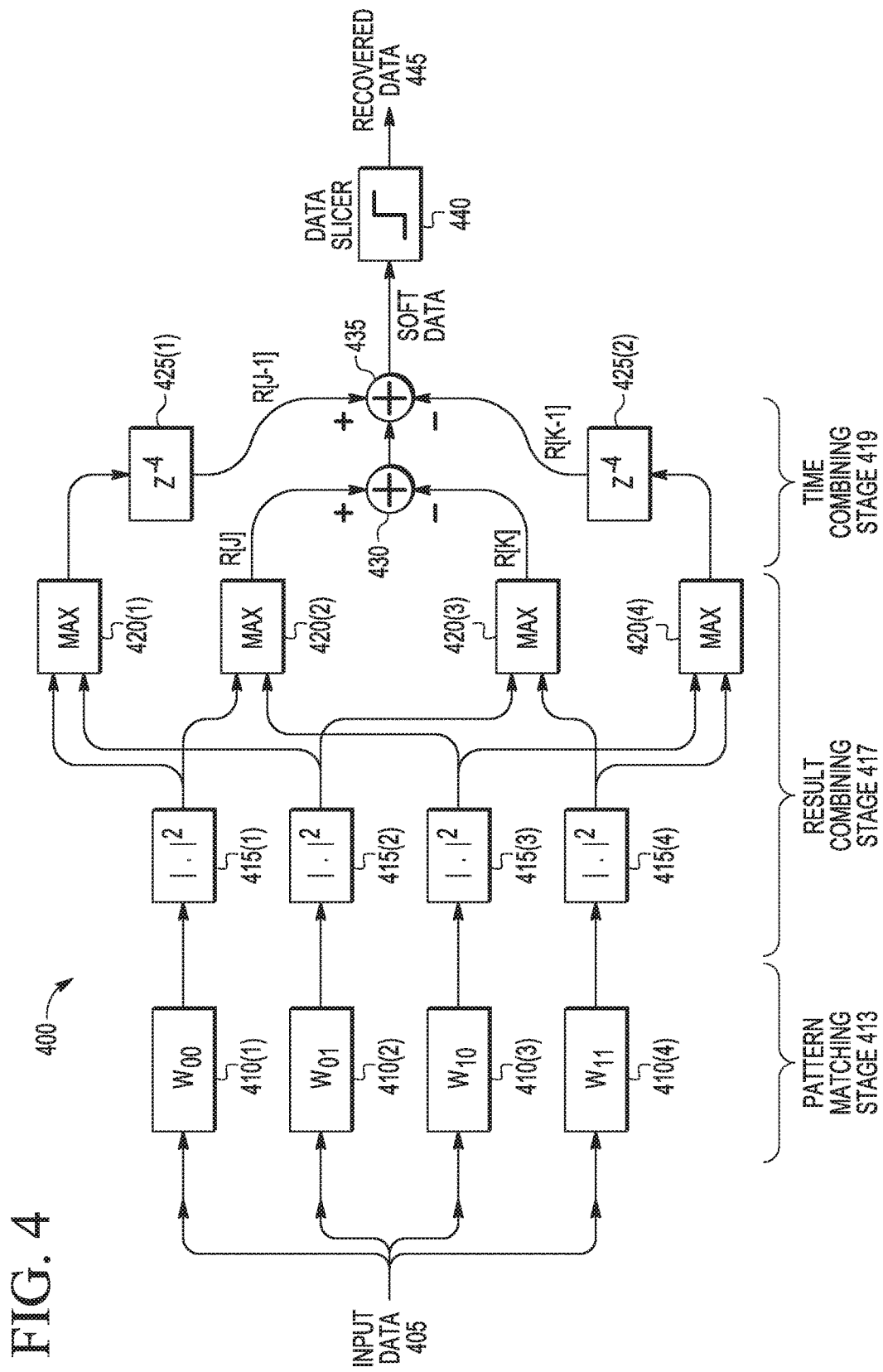
FIG. 4 illustrates a block diagram depicting another example demodulator in which the disclosure is implemented, according to some embodiments.

FIG. 4 illustrates a block diagram depicting another example demodulator 400 for 2-FSK, which may be included in a receiver system or transceiver system like that shown in FIG. 10. Demodulator 400 is implemented based on maximum likelihood principles. Demodulator 400 includes correlators 410(1)-(N), squaring blocks 415(1)-(N), maximum (MAX) blocks 420(1)-(N), delay blocks 425(1)-(N), adder blocks 430 and 435, and data slicer 440. The correlators 410(1)-(N) form a pattern matching stage 413, the squaring blocks 415(1)-(N) and MAX blocks 420(1)-(N) form a result combining stage 417, delay blocks 425(1)-(2), adder block 430, and adder block 435 form a time combining stage 419. While the squaring blocks 415 are shown as being included in result combining stage 417, they may also be included in pattern matching stage 413 in other embodiments. It is also noted that a correlator (like 410) in combination with a squaring block (like 415) may be referred to herein as correlation circuit. It is noted that correlators 410(1)-(N) of pattern matching stage 413 are configured to perform symbol pattern matching, as further described above in connection with FIG. 11. These components are further discussed below.

Figure 6:
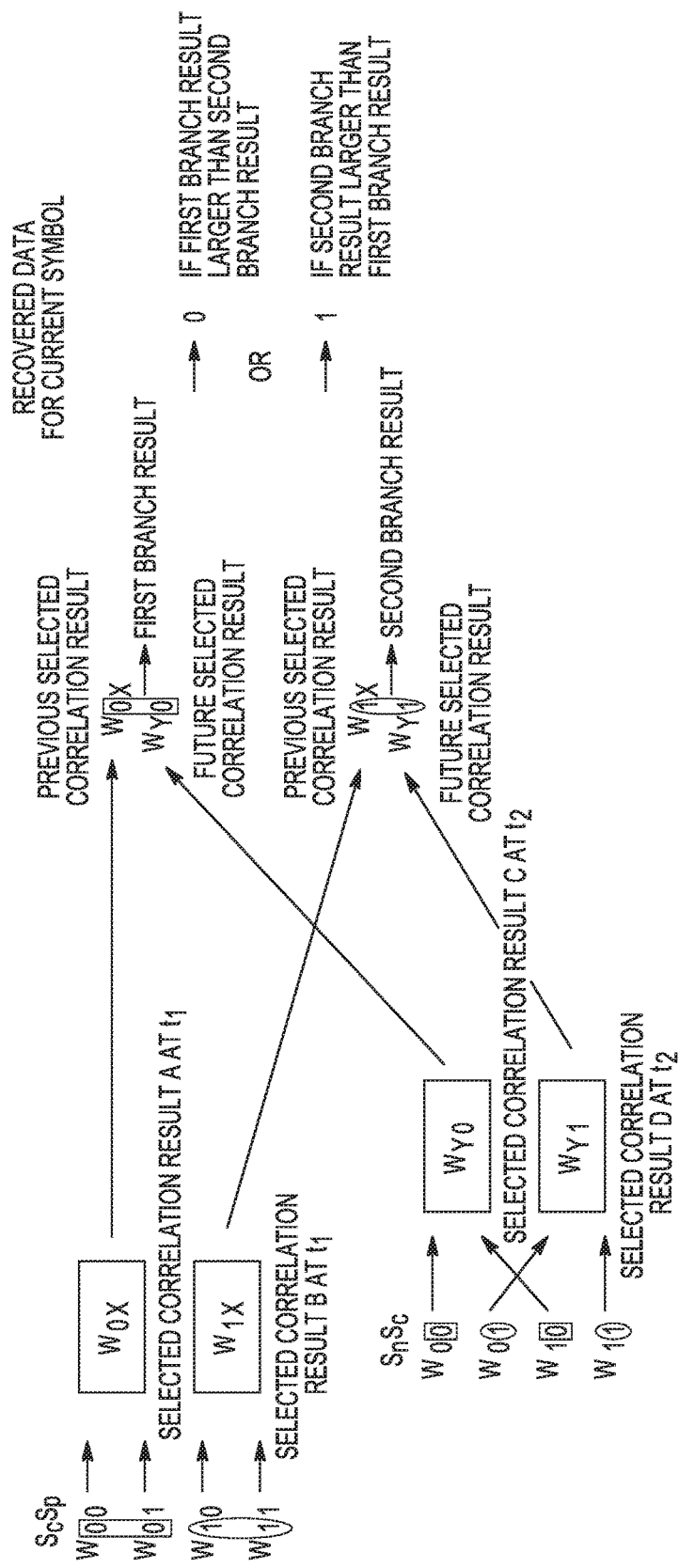
FIG. 6 illustrates a block diagram of an example demodulation decision made by a demodulator like that shown in either FIG. 4 or 5, according to some embodiments.

Demodulator 400 is configured to implement demodulation decisions, examples of which are illustrated in FIG. 6. Correlators 410(1)-(N) (illustrated in FIG. 4 as W00, W01, W10, and W11) are configured to sequentially sample a buffered portion of the input data signal 405 over a sampling period spanning at least two symbol time periods (or 2T). Correlators 410(1)-(N) are configured to output correlation signals that, when selected and combined using maximum likelihood principles as described below, produce a demodulation decision for the value of the current symbol Sc based on the symbol patterns detected for the Sn, Sc, and Sp portions of the input data signal, where the demodulation decision returns the most likely symbol value for the current symbol Sc, which is either '0' or '1'.

On the left side of FIG. 6, correlators sample the input data signal over Sc and Sp portions and output correlation signals indicating a likelihood of whether the Sc and Sp portions match the correlator's respective reference symbol pattern, which also indicates a likelihood of a corresponding symbol value for the current symbol. In the top branch of FIG. 6, a box is shown around Sc being '0' when either W00 or W01 is detected, and a circle is shown around Sc being '1' when either W10 or W11 is detected. The signal power of the W00 and W11 signals is calculated and a maximum signal power of the two signals is selected for result summation and is represented as a selected correlation result A (or simply "result A") made at time t1. The signal power of the W10 and W11 signals is also calculated and a maximum signal power of the two signals is selected for result summation and is represented as a selected correlation result B (or simply "result B") made at time t1. Since results A and B are based in part on past symbol Sp, the results A and B are also referred to as previous results A and B.

When correlators receive a next Sn portion of the input data signal, the correlators sample the input data signal over Sn and Sc portions and output correlation signals that indicate the likelihood of whether the Sc and Sp portions match the correlator's respective reference symbol pattern, indicating a likelihood of a corresponding symbol value for the current symbol. In the bottom branch of FIG. 6, boxes are shown around Sc being '0' when either W00 or W10 is detected and circles are shown around Sc being '1' when either W01 or W11 is detected. The signal power of the W00 and W10 signals is calculated and a maximum signal power of the two signals is selected for result summation and is illustrated as selected correlation result C (or simply "result C") made at time t2. The signal power of the W01 and W11 signals is calculated and a maximum signal power of the two signals is selected for result summation and is illustrated as selected correlation result D (or simply "result D") made at time t2. Since results C and D are based in part on next symbols Sn, the results C and D are also referred to as future results C and D. Time t2 is at least one symbol time period T after time t1.

Previous result A is stored (or delayed for a symbol time period T) until future result C is made in order to align the results for proper result combination for the current symbol, where the current symbol is overlapped by both results. Previous result A is added with the future result C in the top result branch of FIG. 6 to produce a first branch result that indicates the likelihood of current symbol Sc being a '0'. Similarly, previous result B is delayed until future result D is made, and previous result B is added with future result D in the bottom result branch of FIG. 6 to produce a second branch result that indicates the likelihood of current symbol Sc being a '1'. As similarly discussed above, the sign (positive or negative) and the magnitude of the previous and future results indicate a likelihood (e.g., strong or weak) of whether the current symbol value is '0' or '1'.

The branch result that has the maximum or largest magnitude indicates the most likely symbol value of the current symbol, and the most likely symbol value (as indicated by the largest branch result) is accordingly output as the demodulation decision. In other words, if the magnitude of the first branch result is greater than the magnitude of the second branch result, the most likely symbol value of the current symbol is '0', which is output as the demodulation decision. If the magnitude of the second branch result is greater than the magnitude of the first branch result, the most likely symbol value of the current symbol is '1', which is output as the demodulation decision.

It is noted that the correlators' sampling of the buffered portion of the input data signal including Sc and Sp is also referred to herein as a first sampling iteration at a first sample time t1 of the sampling process, and the correlators' sampling of the buffered portion of the input data signal including Sn and Sc is also referred to herein as a second sampling iteration at a second sample time t2 of the sampling process. Together, these two iterations of the sampling process form a framework on which a demodulation decision for Sc is based, where this framework moves or shifts on each sampling iteration to align Sn with the most recently received symbol of the input data signal for a subsequent demodulation decision. FIG. 9 illustrates the movement of this framework as an example input data signal encoding a sequence of symbols S0-S5 (e.g., X001011Y) over a respective one of time periods T0-T5 is received by demodulator 100. The order of the sequence is illustrated from right to left to show receipt time order (or the order in which the demodulator receives the signal).

A first demodulation decision based on a first framework is illustrated near the top of FIG. 9, with the framework shown on the left side and the demodulation decision shown on the right side. Each framework is viewed as including Sn, Sc, and Sp, where first framework includes the symbol portion S1 being equivalent to Sn, the symbol portion S0 being equivalent to Sc, and the symbol portion S[−1] being equivalent to Sp. For the first demodulation decision, correlators (sequentially) receive symbol portions S[−1] and S0 and perform a first sampling iteration once receipt of the S0 portion is complete, resulting in a previous selected correlation result (W0X) based on Sc and Sp (or S0 and S[−1]). Correlators then receive the next symbol portion S1 and a second sampling iteration is performed on the symbol portions S0 and S1 once receipt of S1 portion is complete, resulting in a future selected correlation result (W00) based on Sn and Sc (or S1 and S0). The previous selected correlation result and the future selected correlation result are added (shown as an oval with a solid line), as discussed above, resulting in a present demodulation decision that returns the most likely symbol value for the current symbol S0 based on S1, S0, and S[−1] (shown as '0').

The framework shifts on receipt of the next symbol portion S2, illustrated in the next row of FIG. 9. The second framework includes the symbol portion S2 being equivalent to Sn, the symbol portion S1 being equivalent to Sc, and the symbol portion S0 being equivalent to Sp. The future selected correlation result from the first framework is stored for at least a symbol duration period T and becomes the previous selected correlation result for the second framework (shown as an oval with a dashed line carrying the result over to the next framework by the arrow). Correlators perform another sampling iteration for the symbol portions S2 and S1, and a future selected correlation result is made (W10) based on Sn and Sc (or S2 and S1). The previous selected correlation result (W00) and the future selected correlation result (W10) are added, resulting in a present demodulation decision for S1 based on S2, S1, and S0

(shown as '0'). The framework shifts again on receipt of the next symbol S3, and the process repeats, as also shown in the remaining rows of FIG. 9.

Returning to FIG. 4, demodulator 400 is configured to receive an input data signal 405 (such as the analog signal provided by down converter 1055 of FIG. 10), which potentially contains an FSK-modulated data signal encoded with one or more data symbols. Input data signal 405 has a known data symbol rate at which the data symbols have been encoded into the input signal, where each data symbol represents one or more bits. As discussed above, each correlator 410 is configured to identify and recover a received analog signal (such as a signal encoded with data symbols) in the presence of noise. Each correlator 410 receives the input data signal 405, processes the signal at the oversampling rate, and outputs a correlation signal having a correlation value or magnitude that indicates whether a target signal is detected.

Correlator 410(1) is configured to detect whether the buffered portion of the input data signal 405 exhibits symbol pattern W00 or, in other words, has a frequency that matches a symbol '0' (or positive) frequency for two consecutive time periods (such as over Tc and Tp during a first sampling iteration, or over Tn and Tc during a second sampling iteration). Correlator 410(2) is configured to detect whether the buffered portion of the input data signal 105 exhibits symbol pattern W01 or, in other words, has a frequency that matches a symbol '1' (or negative) frequency over one symbol time period and a symbol '0' (or positive) frequency over a subsequent symbol time period (such as a '1' frequency over Tp and a '0' frequency over Tc during a first sampling iteration, or a '1' frequency over Tc and a '0' frequency over Tn during a second sampling iteration).

Correlator 410(3) is configured to detect whether the buffered portion of the input data signal 105 exhibits symbol pattern W10 or, in other words, has a frequency that matches a symbol '0' (or positive) frequency over one symbol time period and a symbol '1' (or negative) frequency over a subsequent symbol time period (such as a '0' frequency over Tp and a '1' frequency over Tc during a first sampling iteration, or a '0' frequency over Tc and a '1' frequency over Tn during a second sampling iteration). Correlator 410(4) is configured to detect whether the buffered portion of the input data signal 405 exhibits symbol pattern W11 or, in other words, has a frequency that matches a symbol '1' (or negative) frequency for two consecutive time periods (such as over Tc and Tp during a first sampling iteration, or over Tn and Tc during a second sampling iteration).

The output of each correlator 410 (also shown as output 1130 of FIG. 11) is coupled to a respective squaring block 415 that is configured to output the absolute square of the correlation signal (or the signal power of the correlation signal) to produce a correlation metric. In other embodiments, each correlator 410 has an output coupled to a respective absolute value block configured to output the absolute value (without squaring the absolute value) of the correlation value or magnitude to produce the correlation metric. The magnitude of each correlation metric at the output of blocks 415(1)-(N) indicates a correlation or likelihood of a matching relationship between the symbols encoded into a received portion of the input data signal 405 and the target symbol pattern that each correlator is configured to detect. The correlation metrics are normalized and also indicate the likelihood of a symbol value for a current symbol Sc, based on the detected symbol pattern.

In result combining stage 417, different combinations of the correlation metrics output from blocks 415(1)-(4) are provided to MAX blocks 420(1)-(4). Each MAX block 420 is configured to receive a number of inputted correlation metrics and to select the correlation metric having the largest magnitude from among the inputted correlation metrics. The selected correlation metric having the greatest magnitude indicates that the buffered portion of the input data signal 405 has the strongest correlation with the target symbol pattern associated with the selected correlation metric, as compared with the other target symbol patterns associated with the other inputted correlation metrics having smaller magnitudes. This selected correlation metric also indicates a likelihood of a symbol value for the current symbol, based on the target symbol pattern detected. Each MAX block 420 provides the selected correlation metric as a correlation result to time combining stage 419, as discussed below. In the embodiment shown in FIG. 4, each MAX block 420 receives two inputted correlation metrics, while in other embodiments, each MAX block receives more than two inputted correlation metrics.

MAX block 420(1) receives outputs of blocks 415(1) and 415(2) and selects the correlation metric having a maximum magnitude, which indicates a likelihood of the current symbol Sc having the symbol '0' value, based on Sc and Sp (such as during a first sampling iteration). MAX block 420(1) outputs the selected correlation metric as a selected correlation result to delay block 425(1), which stores the selected result for at least a single symbol duration period T. In the embodiment shown, correlators 410(1)-(N) are configured to take 4 samples per symbol (and each includes 4 units of delay per symbol time period T), where the delay block 425(1) is configured to store the selected result for one symbol, or output the selected result after 4 units of delay (as indicated by the z value of −4), although other units of delay and other oversampling ratios may be utilized in other embodiments. Since the selected result is based at least in part on Sp, the selected result is also referred to as a previous result.

MAX block 410(2) receives outputs of blocks 415(1) and 415(3) and selects the correlation metric having a maximum magnitude, which indicates a likelihood of the current symbol Sc having the symbol '0' value, based on Sn and Sc (such as during a second sampling iteration). MAX block 420(2) outputs the selected correlation metric as a selected correlation result R[J]. Since result R[J] is based at least in part on Sn, result R[J] is also referred to as a future result R[J]. Similarly, the previous result that is output by delay block 425(1) is referred to as a previous result R[J−1], where [J−1] indicates that the previous result was generated at a time previous to when future result R[J] was generated (i.e., by at least a symbol time period T). Previous result R[J−1] is stored until future result R[J] is output in order to align the combination of previous and future results by adder blocks 430 and 435 (discussed below), which indicate the likelihood of a value of '0' for the current symbol based on Sn, Sc, and Sp. Accordingly, MAX blocks 420(1) and 420(2) form a branch that detects whether the current symbol Sc is '0'.

MAX block 420(3) receives outputs of blocks 415(2) and 415(4) and selects the correlation metric having a maximum magnitude, which indicates a likelihood of the current symbol Sc having the symbol '1' value, based on Sn and Sc (such as during a second sampling iteration). MAX block 420(3) outputs the selected correlation metric as a selected correlation result, or future result R[K].

MAX block 420(4) receives outputs of 415(3) and 415(4) and selects the correlation metric having a maximum magnitude, which indicates a likelihood of the current symbol Sc having the symbol '1' value, based on Sc and Sp (such as during a first sampling iteration). MAX block 420(4) outputs the selected correlation metric as a selected correlation result to delay block 425(2), which stores the selected result for at least a single symbol duration period T and outputs previous result R[K−1]. Previous result R[K−1] is stored until future result R[K] is output in order to align the combination of previous and future results by adder blocks 430 and 435 (discussed below), which indicate the likelihood of a value of '1' for the current symbol based on Sn, Sc, and Sp. Accordingly, MAX blocks 420(3) and 420(4) form a branch that detects whether the current symbol is '1'.

In time combining stage 419, a set of future correlation results (including R[J] and R[K]) are combined with a set of previous correlation results (including R[J−1] and R[K−1]) to produce a present demodulation decision. The outputs of MAX blocks 420(2) and 420(3) are provided to adder block 430 for summation, which outputs a future combined correlation result. Adder block 430 outputs the difference between future results R[J] and R[K], which indicates the likelihood of the current symbol Sc having a symbol value of either '0' or '1'. For example, if R[J] is larger than R[K] (indicating a greater likelihood that Sc matches a symbol '0' value), then the output of adder block 430 is a positive value, where the magnitude of that positive value corresponds to the likelihood of the current symbol value being '0' (e.g., small positive value indicates weak likelihood, large positive value indicates strong likelihood). If R[K] is larger than R[J] (indicating a greater likelihood that Sc matches a symbol '1' value), then the output of adder block 430 is a negative value, where the magnitude of that negative value corresponds to the likelihood of the current symbol value being '1'. The output of adder block 430 is provided to adder block 435.

The outputs of delay blocks 425(1) and 425(2) are provided to adder block 435. Adder block 435 adds or sums the future combined correlation result from block 430 with previous result R[J−1], and subtracts previous result R[K−1]. The combination of previous results R[J−1] and R[K−1] may also be referred to as a previous combined correlation result that is combined with the future combined correlation result. It is noted that the difference between results R[J−1] and R[K−1] also indicates a likelihood of the current symbol Sc having a symbol value of either '0' or '1'. For example, if R[J−1] is larger than R[K−1] (indicating a greater likelihood that Sc matches a symbol '0' value), then the previous combined correlation result is positive. If R[K−1] is larger than R[J−1] (indicating a greater likelihood that Sc matches a symbol '1' value), then the previous combined correlation result is negative. In this manner, the previous combined correlation result reinforces the future combined correlation result.

In the embodiment shown, the output of adder block 435 outputs soft data, or a value that indicates a most likely symbol value for the current symbol, based on detection of a target symbol pattern over symbols Sn, Sc, and Sp. The sign of the soft data value indicates a current symbol value of '0' (if positive) or '1' (if negative). While this embodiment indicates a particular mapping of the soft data value to the current symbol value, other mappings may be used in other embodiments (such as a current symbol value of '1' if positive, or '0' if negative), depending on how the correlation results are added in the demodulator. The soft data value is provided to data slicer 440, which outputs recovered data 445 based on the sign of the soft data. For example, if the output of adder block 435 is positive, data slicer 440 outputs a data value (or bit in 2-FSK) of '0'. If the output of adder block 435 is negative, data slicer 440 outputs a data value (or bit in 2-FSK) of '1'. Each original data symbol can thus be recovered from the received analog input data signal 405.

Figure 7:
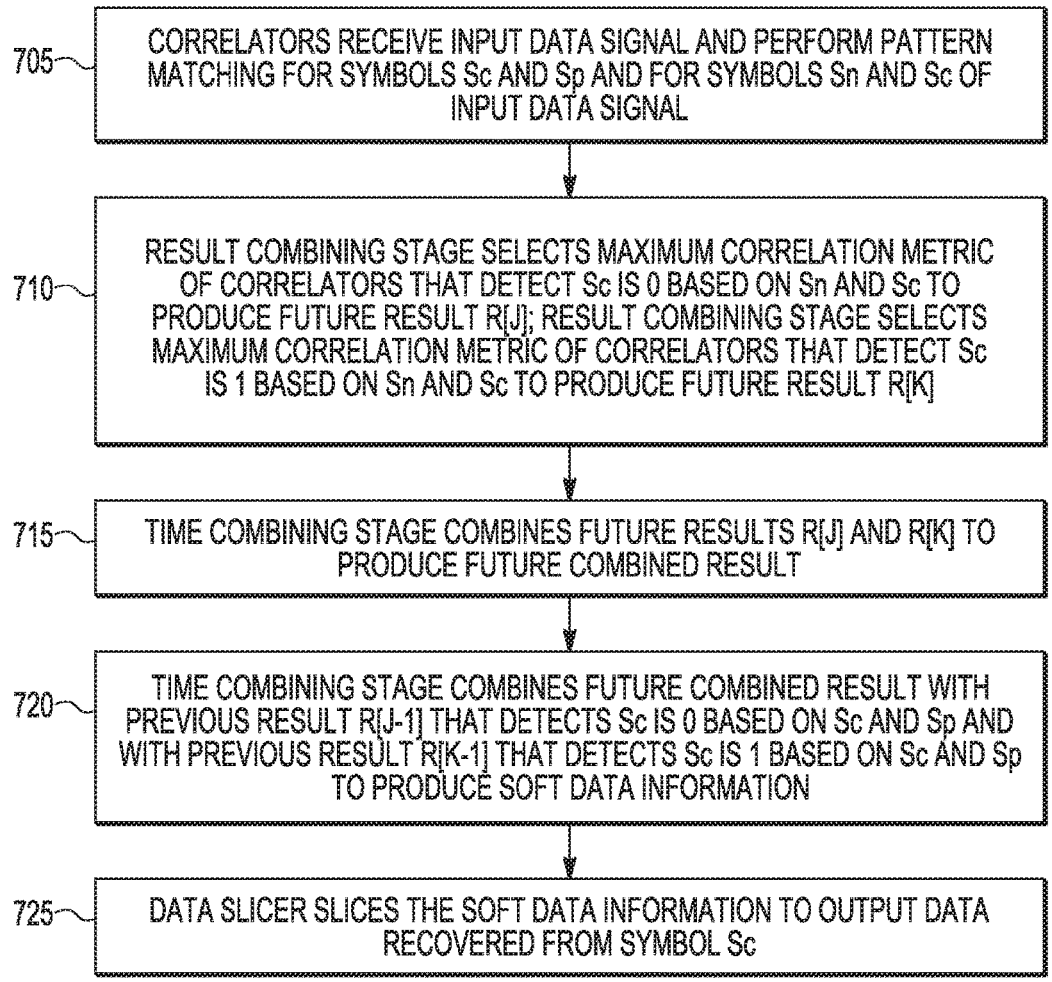
FIG. 7 illustrates a flowchart depicting an example demodulation process implemented by the demodulator of FIG. 4, according to some embodiments.

FIG. 7 illustrates a flowchart depicting an example demodulation process implemented by the demodulator 400 of FIG. 4. The demodulation process begins at operation 705, where correlators 410(1)-(N) are configured to receive the input data signal and perform pattern matching over a sampling period spanning at least two symbol time periods (or 2T). Correlators output correlation signals, and corresponding correlation metrics are generated based on the signal power of such signals. Maximum ones of those correlation metrics are selected as correlation results, as discussed above. The correlation results corresponding to symbols Sc and Sp (e.g., for a first sampling iteration) are stored by delay blocks 425(1) and 425(2) for at least a symbol duration period T to become previous results R[J−1] and R[K−1] utilized in operation 720 below. Correlation results corresponding to symbols Sn and Sc (e.g., for a second sampling iteration) are provided as future results R[J] and R[K] utilized in operation 715 below. The previous and future results each indicate a likelihood of a symbol value for a current symbol. It is noted that the remaining operations of the process illustrated in FIG. 7 are performed in view of the second sampling iteration (for Sn and Sc).

The process continues to operation 710, where a branch of result combining stage (e.g., MAX block 420(2)) selects a maximum correlation metric of correlators (e.g., 410(1) and 410(3)) that detect current symbol Sc is '0' based on symbols Sn and Sc to produce future result R[J]. Another branch of result combining stage (e.g., MAX block 420(3)) selects the maximum correlation metric of correlators (e.g., 410(2) and 410(4)) that detect current symbol Sc is '1' based on symbols Sn and Sc to produce future result R[K]. The process continues to operation 715, where time combining stage (e.g., adder block 430) combines the future results R[J] and R[K] to produce a future combined result.

The process continues to operation 720, where the branches of time combining stage are joined (e.g., adder block 435) and the future combined result is summed with the previous result R[J−1] and the previous result R[K−1] that were generated during the previous time period (e.g., during the first sampling iteration). Result R[J−1] was output by a branch of result combining stage (e.g., MAX block 420(1)) that selected the maximum correlation metric of correlators (e.g., 410(1) and 410(2)) that detect current symbol Sc is '0' based on symbols Sc and Sp, which was stored by time combining stage (e.g., delay block 425(1)) until generation of the future result R[J]. Result R[K−1] was output by another branch of result combining stage (e.g., MAX block 420(4)) that selected the maximum correlation metric of correlators (e.g., 410(3) and 410(4)) that detect current symbol Sc is '1' based on symbol Sc and Sp, which was stored by time combining stage (e.g., delay block 425(2)) until generation of the future result R[K]. In the embodiment shown, time combining stage (e.g., adder block 435) outputs soft data information based on the difference between the future results R[J] and R[K] that is summed with the difference between the previous results R[J−1] and R[K−1], where R[J] and R[J−1] represent a likelihood that the current symbol is '0' and R[K] and R[K−1] represent a likelihood that the current symbol is '1'.

The process continues to operation 725, where data slicer "slices" the soft data information received from time combining stage, as discussed above, and outputs data recovered from symbol Sc encoded into the input data signal. The process repeats for each subsequently received portion of the input data signal. For example, on a subsequent iteration of the process illustrated in FIG. 7, the process returns to operation 705, where the correlators receive a subsequently received symbol of the input data signal and the framework shifts to align Sn with the most recently received symbol of the input data signal. Also, results R[J−1] and R[K−1] that will be utilized in a subsequent iteration of operation 720 are originally generated at the same time as the future results R[J] and R[K] in the first iteration of operation 710.

Figure 5:
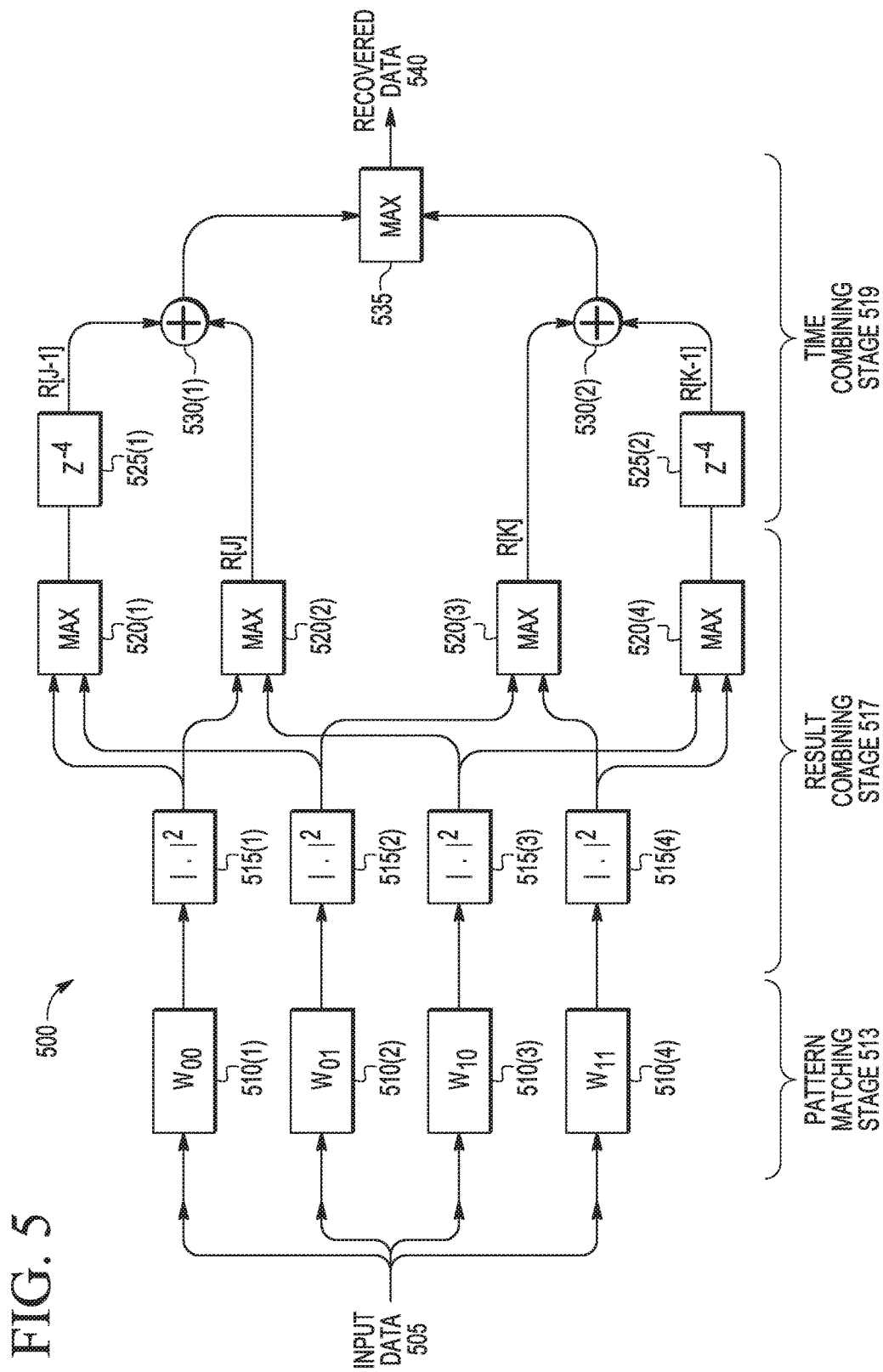
FIG. 5 illustrates a block diagram depicting another example demodulator in which the disclosure is implemented, according to some embodiments.

FIG. 5 illustrates a block diagram depicting another example demodulator 500 for 2-FSK, which may be included in a receiver system or transceiver system like that shown in FIG. 10. Demodulator 500 is also implemented based on maximum likelihood principles. Demodulator 500 includes correlators 510(1)-(N), squaring blocks 515(1)-(N), maximum (MAX) blocks 520(1)-(N) and 535, delay blocks 525(1)-(N), adder blocks 530(1) and 530(2). The correlators 510(1)-(N) form a pattern matching stage 513, squaring blocks 515(1)-(N) and MAX blocks 520(1)-(N) form a result combining stage 517, delay blocks 525(1) and 525(2), adder blocks 530(1) and 530(2), and MAX block 535 form a time combining stage 519. While the squaring blocks 515 are shown as being included in result combining stage 517, they may also be included in pattern matching stage 513 in other embodiments. Correlators 510(1)-(4), squaring blocks 515(1)-(4), and MAX blocks 520(1)-(4), and delay blocks 525(1)-(2) are configured to operate in a similar manner as their counterparts in FIG. 4, as discussed above, and are arranged similarly to that shown in FIG. 4, unless discussed otherwise.

In time combining stage 519, MAX block 520(2) outputs a future result R[J] (based on Sn and Sc) and delay block 525(1) outputs a previous result R[J−1] (based on Sc and Sp), which are added or summed at adder block 530(1) to produce a first combined correlation result indicating the likelihood of the current symbol Sc having the symbol '0' value. MAX block 520(3) outputs a future result R[J] (based on Sn and Sc) and delay block 525(2) outputs a previous result R[K−1] (based on Sc and Sp), which are added or summed at adder block 530(2) to produce a second combined correlation result indicating the likelihood of the current symbol Sc having the symbol '1' value. The outputs of adder blocks 530(1) and 530(2) are provided to MAX block 535, which selects the maximum of the first and second combined correlation results to select the most likely symbol value of the current symbol Sc and outputs recovered data 540 in response. In the embodiment shown, the output of MAX block 535 is not soft data, but MAX block 535 is configured to output a value representing a '0' if the first combined correlation result (e.g., output of adder block 530(1)) is greater than the second combined correlation result (e.g., output of adder block 530(2)). MAX block 535 is also configured to output a value representing a '1' if the second combined correlation result (e.g., output of adder block 530(2)) is greater than the first combined correlation result (e.g., output of adder block 530(1)). While this embodiment indicates a particular mapping of the output of MAX block 535 to the current symbol value, other mappings may be used at MAX block 535 (such as a current symbol value of '1' if the first combined correlation result is greater, or '0' if the second combined correlation result is greater).

Figure 8:
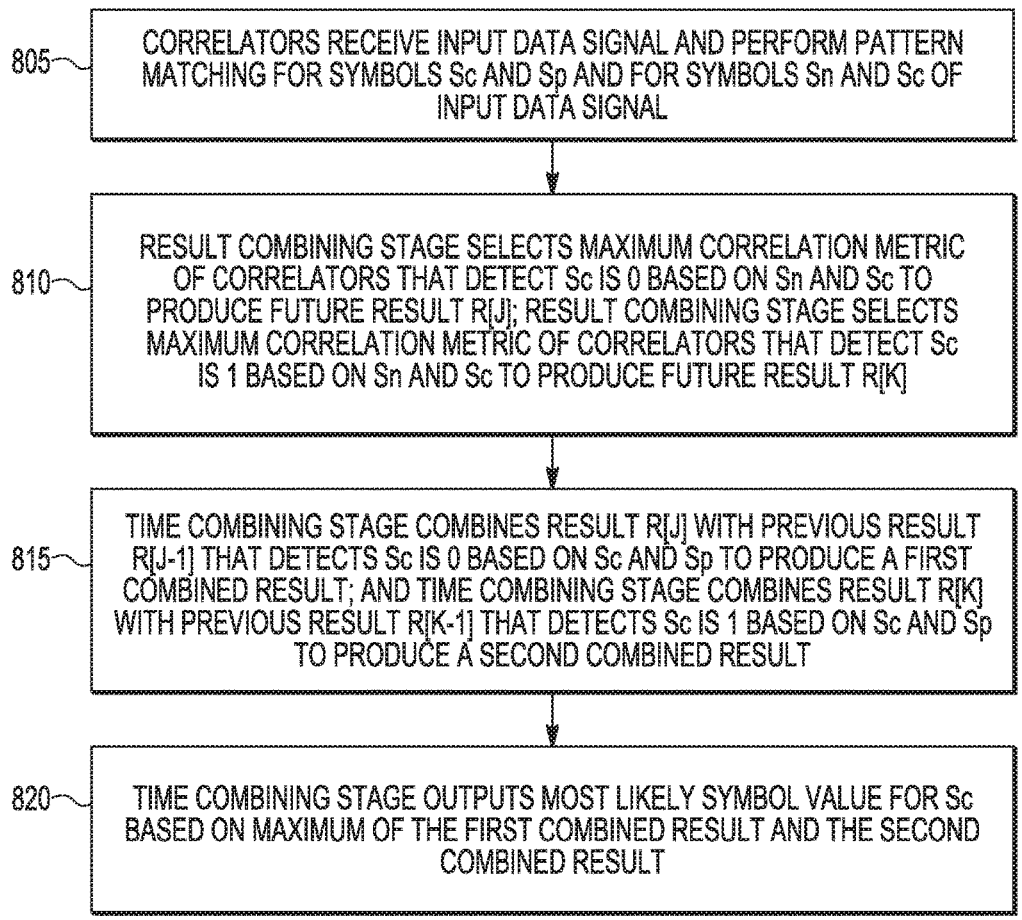
FIG. 8 illustrates a flowchart depicting an example demodulation process implemented by the demodulator of FIG. 5, according to some embodiments.

FIG. 8 illustrates a flowchart depicting an example demodulation process implemented by the demodulator 500 of FIG. 5. The demodulation process begins at operation 805, where correlators 510(1)-(N) are configured to receive the input data signal and perform pattern matching over a sampling period spanning at least two symbol time periods (or 2T). Correlators output correlation signals, and corresponding correlation metrics are generated based on the signal power of such signals. Maximum ones of those correlation metrics are selected as correlation results, as discussed above. The correlation results corresponding to symbols Sc and Sp (e.g., for a first sampling iteration) are stored by delay blocks 525(1) and 525(2) for at least a symbol duration period T to become previous results R[J−1] and R[K−1] utilized in operation 815 below. Correlation results corresponding to symbols Sn and Sc (e.g., for a second sampling iteration) are provided as future results R[J] and R[K] utilized in operation 810. The previous and future results each indicate a likelihood of a symbol value for a current symbol. It is noted that the remaining operations of the process illustrated in FIG. 8 are performed in view of the second sampling iteration (for Sn and Sc).

The process continues to operation 810, where a branch of result combining stage (e.g., MAX block 520(2)) selects the maximum correlation metric of correlators (e.g., 510(1) and 510(3)) that detect current symbol Sc is '0' based on symbols Sn and Sc to produce future result R[J]. Another branch of result combining stage (e.g., MAX block 520(3)) selects the maximum correlation metric of correlators (e.g., 510(2) and 510(4)) that detect current symbol Sc is '1' based on symbols Sn and Sc to produce future result R[K].

The process continues to operation 815, where time combining stage (e.g., adder block 530(1)) combines the future result R[J] and previous result R[J−1] that was generated during the previous time period (e.g., during the first sampling iteration) to produce a first combined result. Result R[J−1] was output by a branch of result combining stage (e.g., MAX block 520(1)) that selected the maximum correlation metric from correlators (e.g., 510(1) and 510(2)) that detect current symbol Sc is '0' based on symbols Sc and Sp, which was stored by time combining stage (e.g., delay block 525(1)) until generation of the future result R[J]. Time combining stage (e.g., adder block 530(2)) also combines the future result R[K] and previous result R[K−1] that was generated during the previous time period (e.g., during the first sampling iteration) to produce a second combined result. Result R[K−1] was output by another branch of result combining stage (e.g., MAX block 420(4)) that selected the maximum correlation metric from correlators (e.g., 410(3) and 410(4)) that detect current symbol Sc is '1' based on symbol Sc and Sp, which was stored by time combining stage (e.g., delay block 425(2)) until generation of the future result R[K].

The process continues to operation 820, where time combining stage (e.g., MAX block 535) outputs the most likely symbol value for Sc based on the maximum of the first and second combined results, where the first combined result represents a likelihood that the current symbol is '0' and the second combined result represents a likelihood that the current symbol is '1'. If the first combined result is larger than the second combined result, '0' is output as data recovered from the input data signal. If the second combined result is larger than the first combined result, '1' is output as data recovered from the input data signal.

The process repeats for each subsequently received portion of the input data signal. For example, on a subsequent iteration of the process illustrated in FIG. 8, the process returns to operation 805, where the correlators receive a subsequently received symbol of the input data signal and the framework shifts to align Sn with the most recently received symbol of the input data signal. Also, results R[J−1] and R[K−1] that will be utilized in a subsequent iteration of operation 815 are originally generated at the same time as the future results R[J] and R[K] in the first iteration of operation 810.

Additional Embodiments

Figure 12:
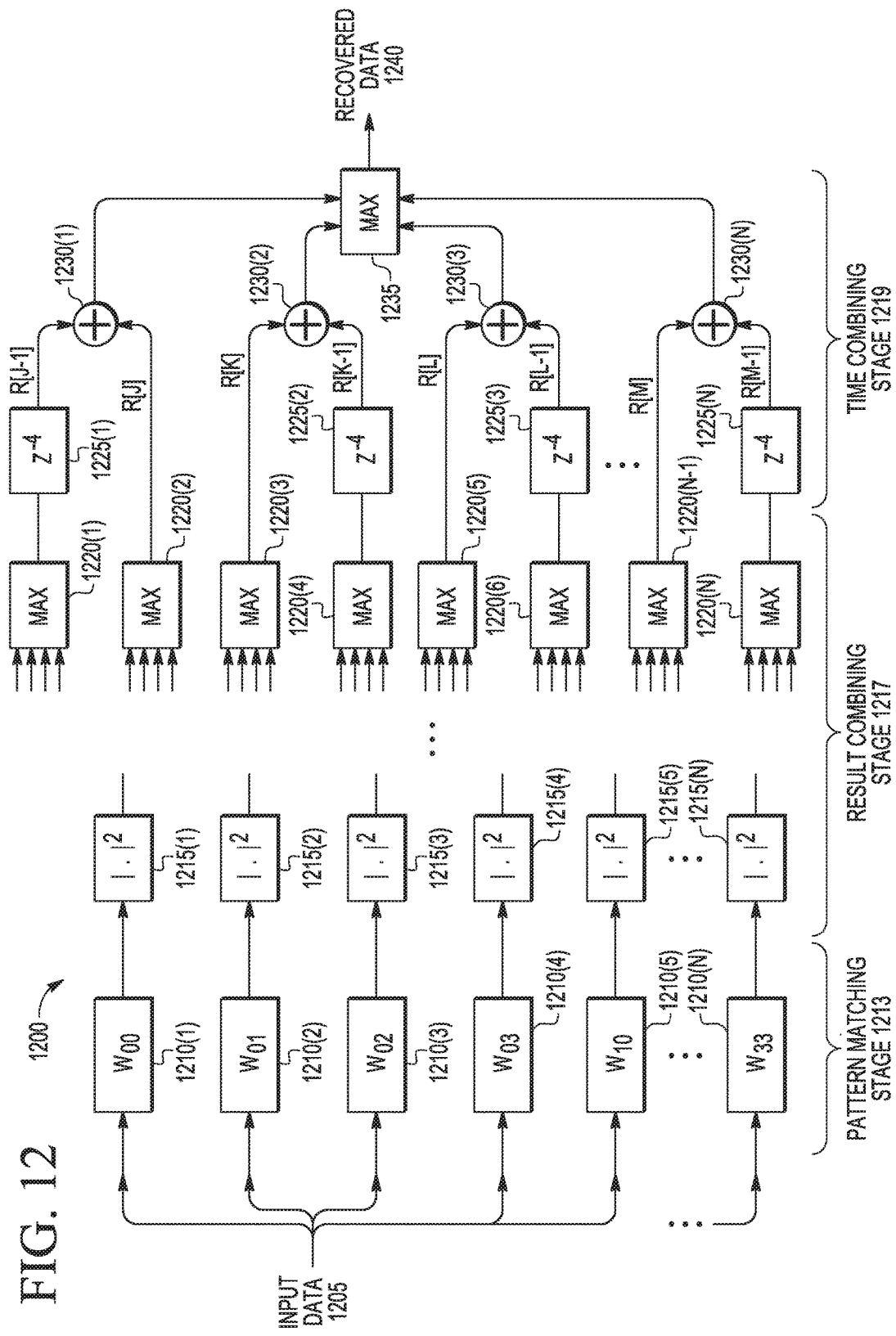
FIG. 12-14 illustrate block diagrams depicting other example demodulators in which the disclosure is implemented, according to some embodiments.

The contextual demodulator based on maximum likelihood principles discussed herein can be extended to implement other demodulation embodiments in order to make a demodulation decision for a current symbol based on one or more past symbols and one or more next symbols. For example, a 4-FSK embodiment of a contextual demodulator 1200 is illustrated in FIG. 12, which has a structure similar to that shown in FIG. 5. Demodulator 1200 includes correlators 1210(1)-(N), squaring blocks 1215(1)-(N), maximum (MAX) blocks 1220(1)-(N) and 1235, delay blocks 1225(1)-(N), and adder blocks 1230(1)-(N), which are configured to operate in a similar manner as their counterparts discussed above, unless discussed otherwise. The correlators 1210(1)-(N) form a pattern matching stage 1213, squaring blocks 1215(1)-(N) and MAX blocks 1220(1)-(N) form a result combining stage 1217, delay blocks 1225(1)-(N), adder blocks 1230(1)-(N), and MAX block 1235 form a time combining stage 1219. While the squaring blocks 1215 are shown as being included in result combining stage 1217, they may also be included in pattern matching stage 1213 in other embodiments.

In the 4-FSK embodiment, demodulator 1200 includes sixteen correlators 1210, although demodulator 1200 may include more or less than sixteen correlators in other embodiments. Each correlator 1210 is configured to detect a respective one of a number of target signals encoding one of the following pairs of reference symbols: 00, 01, 02, 03, 10, 11, 12, 13, 20, 21, 22, 23, 30, 31, 32, and 33. Each correlator 1210 is coupled to a respective squaring block 1215. Ones of the squaring blocks 1215 are coupled to ones of the MAX blocks 1220. In the embodiment shown, each MAX block 1220 has four inputs that are coupled to the respective output of four squaring blocks 1215 (as discussed below), although each MAX block 1220 may receive more or less than four inputs in other embodiments. MAX blocks 1220 are paired to form branches configured to detect whether a respective symbol value has been detected for the current symbol Sc in the buffered portion of the input data signal 1205.

Each pair of MAX blocks 1220 includes a first MAX block 1220 having an output coupled to a delay block element 1225 (whose output is coupled to adder block 1230) and a second MAX block 1220 having an output directly coupled to adder block 1230. The first MAX blocks 1220 are each configured to receive ones of a first set of correlation metrics from squaring blocks 1215 that were generated at a first sample time for a first sampling iteration by the correlators 1210 and output the correlation metric having a maximum magnitude as a selected correlation result. Since the selected correlation result is delayed for at least a symbol duration period by delay block 1225, the selected correlation results outputted by the first MAX blocks 1220 are also referred to as a set of previous correlation results. The set of previous correlation results are based on Sc and Sp portions of the input data signal 1205. For example, MAX block 1220(1) receives the outputs of squaring blocks 1215(1)-(4), which are coupled to correlators detecting W00, W01, W02, and W03 (in the order W[Sc][Sp]), indicating the likelihood that Sc has a symbol value of '0'. Similarly, MAX block 1220(N) receives the outputs of squaring blocks 1215(N-3)-(N) (equivalent to blocks 1215(13)-(16) in the 4-FSK embodiment), which are coupled to correlators detecting W30, W31, W32, and W33, indicating the likelihood that Sc has a symbol value of '3'.

The second MAX blocks 1220 are each configured to receives ones of a second set of correlation metrics from squaring blocks 1215 that are generated at a second sample time for a second sampling iteration by the correlators 1210 and output the correlation metric having a maximum magnitude as a selected correlation result. The second sample time occurs at least one symbol duration period after the first sample time. The selected correlation results outputted by the second MAX blocks 1220 are also referred to as a set of future correlation results. The set of future correlation results are based on Sn and Sc portions of the input data signal 1205. For example, MAX block 1220(2) receives the outputs of squaring blocks 1215(1), 1215(5), 1215(9), and 1215(13), which are coupled to correlators detecting W00, W10, W20, and W30 (in the order W[Sn][Sc]), indicating the likelihood that Sc has a symbol value of '0'. Similarly, MAX block 1220(N-1) receives the outputs of squaring blocks 1215(4), 1215(8), 1215(12), and 1215(16), which are coupled to correlators detecting W03, W13, W23, and W33, indicating the likelihood that Sc has a symbol value of '3'.

A respective previous correlation result and a respective future correlation result are added at adder blocks 1230 to produce a respective combined result that indicates the likelihood of the current symbol Sc having a respective symbol value. For example, results R[J-1] and R[J] are summed at adder block 1230(1), which outputs a first combined result that indicates the likelihood of the current symbol Sc having a symbol value of '0'. Results R[K-1] and R[K] are summed at block 1230(2), which outputs a second combined result that indicates the likelihood of the current symbol Sc having a symbol value of '1'. Results R[L-1] and R[L] are summed at block 1230(3), which outputs a third combined result that indicates the likelihood of the current symbol Sc having a symbol value of '2'. Results R[M-1] and R[M] are summed at block 1230(N), which outputs a fourth combined result that indicates the likelihood of the current symbol Sc having a symbol value of '3'.

The combined results are provided to MAX block 1235, which selects the combined result having the greatest magnitude, which indicates the greatest likelihood of the current symbol Sc having the respective symbol value. In the example shown, recovered data 1240 has a symbol value of '0' when the output of adder block 1230(1) is greatest, recovered data 1240 has a symbol value of '1' when the output of adder block 1230(2) is greatest, recovered data 1240 has a symbol value of '2' when the output of adder block 1230(3) is greatest, and recovered data 1240 has a symbol value of '3' when the output of adder block 1230(N) is greatest.

It is noted that the embodiments above describe making a demodulation decision for a current symbol based on two pairs of symbols that include the current symbol Sc: (1) a pair of symbols that includes the current symbol Sc and a past symbol Sp, and (2) another pair of symbols that includes the current symbol Sc and a next symbol Sn. Another demodulation embodiment includes a contextual demodulator that implements 2-FSK and makes a demodulation decision for the current symbol Sc based on a single "triplet" of symbols that includes the past symbol Sp, the current symbol Sc, and the next symbol Sn. Rather than buffering and sampling two consecutive symbols at a time as shown above, this embodiment of a contextual demodulator includes correlators configured to buffer and sample at least three consecutive symbol time periods. Such a contextual demodulator has a pattern matching stage that includes eight correlators, each correlator configured to detect a respective one of a number of target signals encoding one of the following triplets of reference symbols 000, 001, 010, 011, 100, 101, 110, 111. In this embodiment of a contextual demodulator, the contextual demodulator would not need to include a time combining stage, since each correlator takes the past symbol Sp and next symbol Sn of the single triplet into account when determining the symbol value of the current symbol Sc. However, such a contextual demodulator would implement 12 multipliers in each correlator (in an embodiment where each symbol is sampled 4 times and each correlator buffers 3 symbols of the input data signal), resulting in a total of 96 multipliers. By contrast, the contextual demodulator discussed above in connection with FIG. 5 (as well as the demodulator of FIG. 4) includes four correlators, each correlator implementing 8 multipliers (in an embodiment where each symbol is sampled 4 times and each correlator buffers 2 symbols of the input data signal), resulting in a total of 32 multipliers. In other words, the contextual demodulator of FIG. 5 (and FIG. 4) consumes 3 times less power to perform demodulation than a contextual demodulator having correlators that buffers and samples three consecutive symbols at a time. As the complexity of a contextual demodulator is increased due to additional components, the demodulator becomes more expensive. Accordingly, the demodulators of FIGS. 4 and 5 discussed above provide a balanced approach to low cost and good performance.

This triplet concept can also be extended, where another demodulation embodiment includes a contextual demodulator that implements 2-FSK and makes a demodulation decision for a current symbol based on two triplets of symbols that include the current symbols Sc: (1) a triplet of symbols that includes the current symbol Sc and two past symbols Sp1 and Sp2 (e.g., the past symbol Sp1 is the symbol immediately preceding the current symbol Sc, and the past symbol Sp2 is the symbol immediately preceding the past symbol Sp1), and (2) another triplet of symbols that includes the current symbol Sc and two next symbols Sn1 and Sn2 (e.g., the next symbols Sn1 is the symbol immediately following the current symbol Sc, and the next symbol Sn2 is the symbol immediately following the next symbol Sn1). This concept can be expanded to even greater numbers of consecutive symbols before and behind the current symbol, which is especially beneficial if an amount of ISI exists over multiple symbol time periods. However, while such a triplet concept could also be applied to 4-FSK and higher, the added complexity in such an implementation would likely not be worthwhile due to increased expense.

Figure 13:
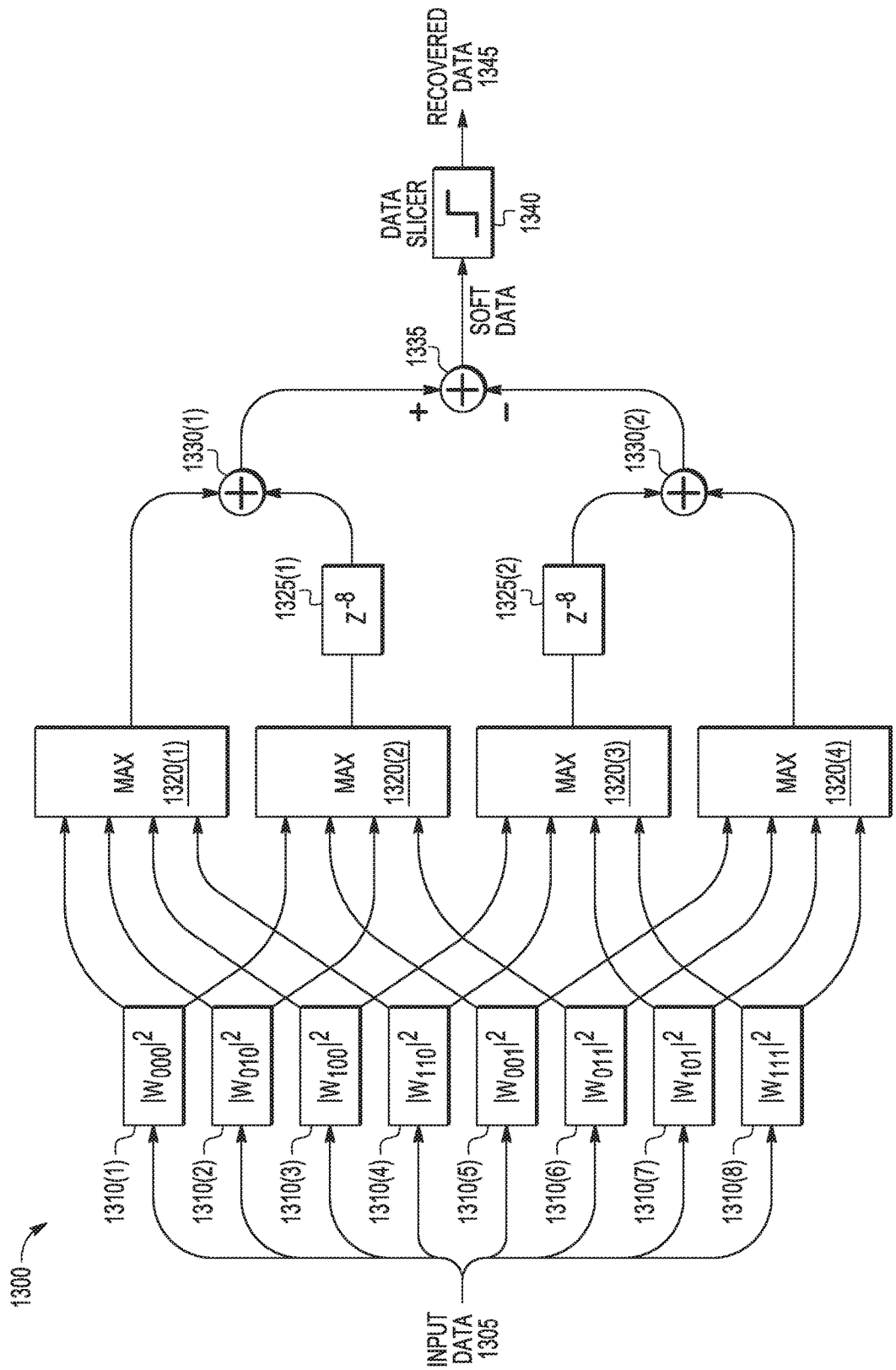
Figure 14:
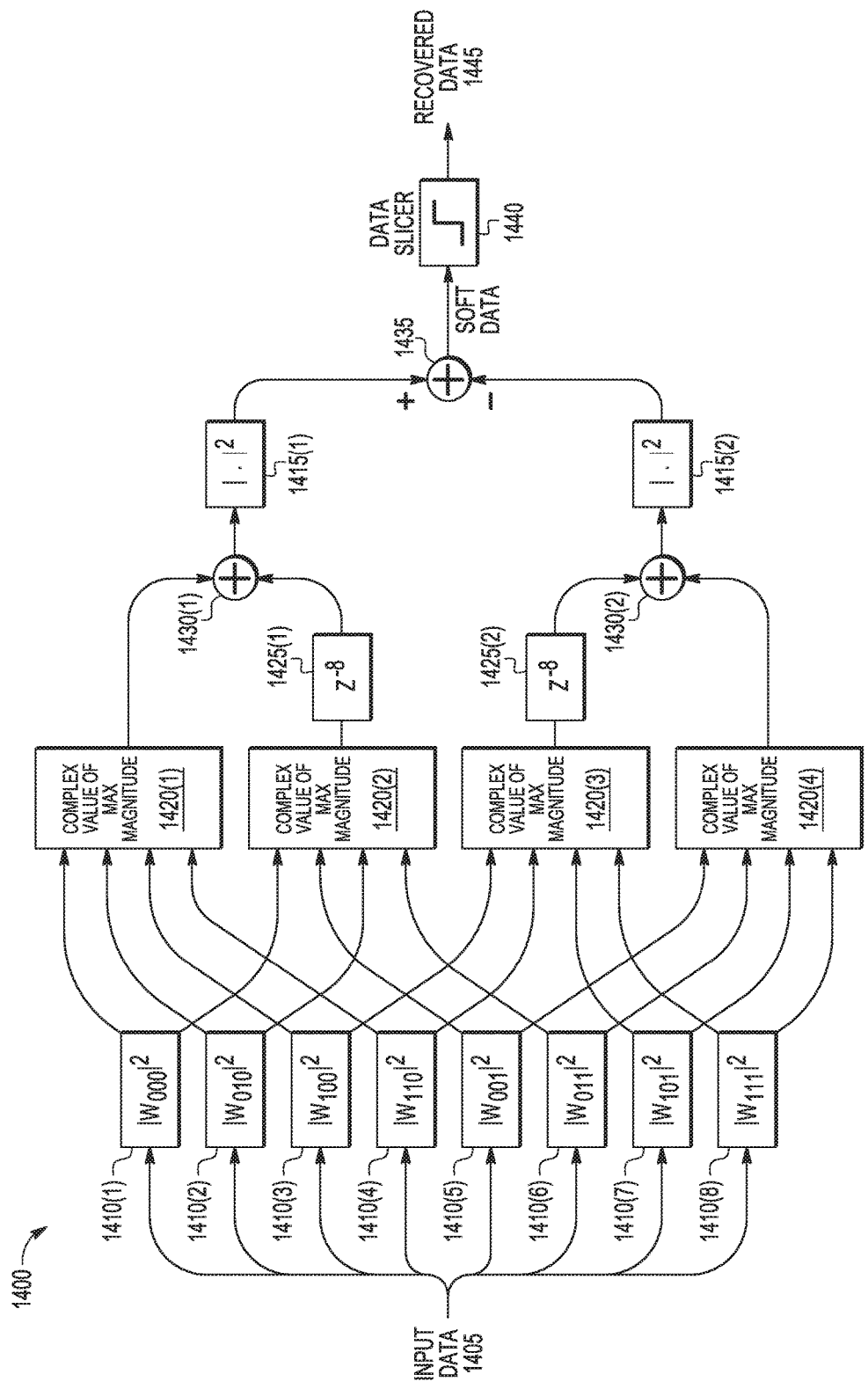

This dual triplet embodiment is shown in FIGS. 13 and 14. In FIG. 13, contextual demodulator 1300 includes correlator circuits 1310(1)-(8), MAX blocks 1320(1)-(4), delay blocks 1325(1)-(2), adder blocks 1330(1)-(2) and 1335. The correlators 1310 form a pattern matching stage, MAX blocks 1320 form a result combining stage, delay blocks 1325 and adder blocks 1330 and 1335 form a time combining stage. It is noted that each correlator 1310 includes a squaring block configured to square an absolute value of correlator output, like those discussed above, and may also be referred to as a correlator circuit 1310.

Demodulator 1300 includes eight correlators 1310, each configured to detect a respective one of a number of target signal encoding one of the following triplets of reference symbols: 000, 001, 010, 011, 100, 101, 110, 111, which can be viewed in the receipt order of [Sn2][Sn1][Sc], or [Sc][Sp1][Sp2]. As the input data 1305 is received and passes through the correlators 1310(1)-(8), each correlator 1310 buffers and samples a past triplet that includes Sc, Sp1, and Sp2, as well as a next triplet that includes Sn2, Sn1, and Sc. The absolute value of each correlator output is also squared to produce a correlation metric. The correlation metrics of correlators 1310(1)-(8) are provided to MAX blocks 1320(1)-(4), each of which receives four correlation metrics and selects a correlation metric having a greatest or largest magnitude from among the four correlation metrics, which is output as a correlation result.

MAX 1320(1) is configured to select a correlation metric that indicates a maximum likelihood of the current symbol having a symbol value of 0 based on the portion of the input signal that includes the next triplet symbols Sn2, Sn1, and Sc. MAX 1320(4) is configured to select a correlation metric that indicates a maximum likelihood of the current symbol having a symbol value of 1 based on the portion of the input signal that includes the next triplet symbols Sn2, Sn1, and Sc. MAX 1320(2) is configured to select a correlation metric that indicates a maximum likelihood of the current symbol having a symbol value of 0 based on the portion of the input signal that includes the past triplet symbols Sc, Sp1, and Sp2. MAX 1320(3) is configured to select a correlation metric that indicates a maximum likelihood of the current symbol having a symbol value of 1 based on the portion of the input signal that includes the past triplet symbols Sc, Sp1, and Sp2.

The outputs of MAX blocks 1320(2) and 1320(3) are each provided to a respective delay block 1325(1) and 1325(2), which delays the respective outputted correlation results for at least two symbol time periods in order to align the comparison of the correlation results based on the past triplet with the correlation results based on the next triplet, overlapping at the current symbol. The outputs of MAX block 1320(1) and delay block 1325(1) are combined at adder block 1330(1) to produce a first combined correlation result indicating the likelihood of the current symbol Sc having a symbol value of '0'. The outputs of MAX block 1320(4) and delay block 1325(2) are combined at adder block 1330(2) to produce a second combined correlation result indicating the likelihood of the current symbol Sc having a symbol value '1'. The outputs of adder blocks 1330(1) and (2) are combined at adder block 1335, which outputs the difference between the first and second combined correlation results as soft data, which indicates the most likely symbol value for the current symbol Sc. The sign of the soft data indicates a current symbol value of '0' (if positive) and '1' (if negative), although other mappings may be utilized in other embodiments, depending on how the combined correlation results are added in the demodulator. The soft data is provided to the data slicer 1340, which detects the positive or negative value of soft data and outputs recovered data 1345 accordingly.

FIG. 14 illustrates another embodiment of a contextual demodulator that implements 2-FSK and makes a demodulation decision for a current symbol based on two triplets of symbols. This embodiment of contextual demodulator is also referred to as performing vector combining. Contextual demodulator 1400 includes correlations circuits 1410(1)-(8), MAX blocks 1420(1)-(4), delay blocks 1425(1)-(2), adder blocks 1430(1)-(2) and 1435, and squaring blocks 1415(1)-(2). The correlation circuits 1410 form a pattern matching stage, MAX blocks 1420 form a result combining stage, delay blocks 1425, adder blocks 1430 and 1435, and squaring blocks 1415 form a time combining stage. It is noted that in some embodiments, each correlation circuit 1410 includes a correlator and a squaring block configured to square a magnitude component of correlator output.

Demodulator 1400 includes eight correlation circuits 1410, each configured to detect a respective one of a number of filter kernel vectors encoding one of the following triplets of reference symbols: 000, 001, 010, 011, 100, 101, 110, 111, which can be viewed in the receipt order of [Sn2][Sn1][Sc], or [Sc][Sp1][Sp2]. The correlators of correlation circuits 1410 each receive complex parts of input data signal 1405 that include real and imaginary parts (such as I/O signals, as discussed above in connection with FIG. 11) and are configured to output a correlation signal having a complex correlation value that includes real and imaginary parts. The complex correlation values may each be viewed as a "correlation vector." The complex correlation values are provided to MAX blocks 1420(1)-(4). Each complex correlation value has a magnitude component and a phase component, where the squared magnitude component of the complex correlation value indicates a likelihood of the current symbol value having a particular symbol value. The squaring blocks of each correlation circuit 1410 output a squared magnitude component for each complex correlation value, which are also provided to MAX blocks 1420(1)-(4). Each MAX block 1420 receives four squared magnitude components and each MAX block 1420 is configured to select the largest squared magnitude component from among the four squared magnitude components and output the complex correlation value associated with the selected squared magnitude component.

MAX 1420(1) is configured to output a first future correlation value having a largest squared magnitude component, which indicates a likelihood of the current symbol having a symbol value of 0 based on the portion of the input signal that includes symbols Sn2, Sn1, and Sc. MAX 1420(4) is configured to output a second future correlation value having a largest squared magnitude component, which indicates a likelihood of the current symbol having a symbol value of 1 based on the portion of the input signal that includes symbols Sn2, Sn1, and Sc. MAX 1420(2) is configured to output a first previous correlation value having a largest squared magnitude component that indicates a likelihood of the current symbol having a symbol value of 0 based on the portion of the input signal that includes symbols Sc, Sp1, and Sp2. MAX 1420(3) is configured to output a second previous correlation value having a largest squared magnitude component that indicates a likelihood of the current symbol having a symbol value of 1 based on the portion of the input signal that includes symbols Sc, Sp1, and Sp2. The portion of the input signal that includes symbols Sc, Sp1, and Sp2 may be referred to as a first triplet, and the portion of the input signal that includes symbols Sn2, Sn1, and Sc may be referred to as a second triplet.

The output of MAX blocks 1420(2) and 1420(3) are each provided to a respective delay block 1425(1) and 1425(2), which delays the respective outputted correlation values for two symbol time periods in order to align the comparison of the correlation values based on the first triplet with the correlation values based on the second triplet, overlapping at the current symbol.

The first future correlation value and the first previous correlation value output by MAX block 1420(1) and delay block 1425(1) are combined at adder block 1430(1). Similarly, the second future correlation value and the second previous correlation value output by MAX block 1420(4) and delay block 1425(2) are combined at adder block 1420(2). It is noted that adder blocks 1430(1) and (2) are configured to use the phase component of each complex correlation value to effectively align each magnitude component of the complex correlation values, using the current symbol as a reference. The complex correlation values can be viewed as vectors, where the complex correlation values can be tentatively rotated or otherwise aligned as a vector using the phase component of each complex correlation value. Since there is no constraint that the future and previous complex correlation values would have the same phase, the phase component of each complex correlation value is used as a rotation angle to align the respective complex correlation value with the angle of the current symbol. The resulting likelihood of the symbol value depends on the magnitude components of the rotated complex correlation values. For example, the first future complex correlation value based on Sn2, Sn1, and Sc is aligned with the angle of Sc, and the first previous complex correlation value based on Sc, Sp1, and Sp2 is aligned with the angle of Sc. If the first future and first previous complex correlation values indicate that a same symbol value for the current symbol was detected, then the alignment of first future and first previous complex correlation values with the angle of the current symbol will likely result in substantial alignment of the magnitude of the first future and first previous complex correlation values in a same direction, despite noise and other impairments. If the first future and first previous complex correlation values indicate different symbol values were detected, then the alignment of the first future and first previous complex correlation values with the angle of the current symbol will likely result in misalignment of the magnitude of the first future and first previous complex correlation values in different directions. Complex correlation values having the same magnitude may even cancel each other out when rotated by the phase component in different directions. It is noted that for a useful received signal, it is highly unlikely that noise and other impairments would be large enough to cause the future and previous correlation values that indicate different symbol values to appear aligned.

Once tentatively aligned, adder block 1430(1) sums the real parts of the first future and first previous complex correlation values and separately sums the imaginary parts of the complex correlation values, and outputs the real sum and the imaginary sum to squaring block 1415(1). Similarly, adder block 1430(2) sums the real parts of the second future and second previous complex correlation values once they are tentatively aligned and separately sums the imaginary parts of the complex correlation values, outputting the real sum and imaginary sum to squaring block 1415(2).

Squaring blocks 1415(1) and (2) are configured to compute a signal power having some magnitude based on the real and imaginary sums respectively provided by adder blocks 1430(1) and (2), such as by squaring the real sum, squaring the imaginary sum, and adding the resulting squares. Accordingly, a magnitude of the output of squaring block 1415(1) indicates a likelihood of the current symbol having a '0' symbol value, and the output of squaring block 1415(2) indicates a likelihood of the current symbol having a '1' symbol value. The outputs of squaring blocks 1415(1) and (2) are summed at adder block 1435, which outputs the difference as soft data, which indicates the most likely symbol value for the current symbol Sc. In the embodiment shown, a positive output value (or soft data value) indicates a symbol value of 0 and a negative output value indicates a symbol value of 1, although other mappings may be used in other embodiments, depending on how the combined correlation results are added. The data slicer 1440 detects the positive or negative value of soft data and outputs recovered data 1445 accordingly.

It is noted that vector combining can also be applied to the approach of two pairs of symbols. A demodulator that implements vector combining has a component layout similar to the layout of FIG. 5, minus the adders 530(1)-(2) and final MAX block 535. In this embodiment, the four correlators are configured to receive an input signal and output a complex correlation value and squaring blocks are configured to provide a squared magnitude of the complex correlation value, as described above. Each complex correlation value and associated squared magnitude are provided to MAX blocks, and each MAX block outputs the complex correlation value associated with the largest magnitude of the received squared magnitude, where selected complex correlation values that are output from MAX blocks 520(1) and 520(4) are delayed. The remaining layout of demodulator includes adder block 1430(1) receiving selected complex correlation values from MAX blocks 520(1) and delayed 520(2) and adder block 1430(2) receiving selected complex correlation values from MAX block 520(3) and delayed 520(4). The adder blocks 1430(1)-(2) are coupled to squaring blocks 1415(1)-(2) and the remainder of the demodulator includes the remaining component layout of FIG. 14.

It is noted that in an embodiment of the contextual demodulator that uses a pair of triplets to generate previous and future correlation results, a third middle correlation result may also be generated. For example, in a sequence of symbols received in time order of (1) A, (2) B, (3) C, (4) D, and (5) E, a previous correlation result based on A, B, and C as Sp2, Sp1, and Sc, respectively, and a future correlation result based on C, D, and E as Sc, Sn1, and Sn2, respectively, are generated. A third correlation result may be generated based on B, C, and D and used to further reinforce the previous and future correlation results.

By now it should be appreciated that there has been provided a contextual demodulator that is configured to make demodulation decisions for a current symbol based on a sequence of one or more past symbols and one or more next symbols. Each demodulation decision is based on one or more future correlation results indicating a most likely symbol value for the current symbol, as based on the next symbol(s) and the current symbol, and one or more previous results indicating a most likely symbol value for the current symbol, as based on the past symbol(s) and the current symbol. The future and previous correlation results are combined, where the previous correlation results reinforce the future correlation results, which produces a demodulation decision that indicates the most likely symbol value for the current symbol.

In one embodiment of the present disclosure, a frequency shift keying (FSK) demodulator for demodulating symbols is provided, which includes: a plurality of correlation circuits, each configured to output a correlation metric that indicates a likelihood of whether a frequency of a buffered portion of an input signal matches a respective target frequency behavior pattern, as the input signal is continuously received by the FSK demodulator; a result combining stage coupled to the plurality of correlation circuits, the result combining stage configured to output a set of first correlation results based on correlation metrics generated for a first portion of the input signal that encodes a current symbol and a past symbol, the current symbol received at the FSK demodulator after the past symbol, and output a set of second correlation results based on correlation metrics generated for a second portion of the input signal that encodes the current symbol and a next symbol, the next symbol received at the FSK demodulator after the current symbol; and a time combining stage coupled to the result combining stage, the time combining stage configured to delay the set of first correlation results until the set of second correlation results are generated to produce a set of delayed first correlation results, and combine the set of delayed first correlation results and the set of second correlation results to produce a demodulation decision that returns a most likely symbol value for the current symbol.

One aspect of the above embodiment provides that the plurality of correlation circuits includes: a first correlation circuit configured to output a first correlation metric that indicates a likelihood of whether the frequency of the buffered portion of the input signal remains greater than a carrier frequency, a second correlation circuit configured to output a second correlation metric that indicates a likelihood of whether the frequency of the buffered portion of the input signal remains less than the carrier frequency, a third correlation circuit configured to output a third correlation metric that indicates a likelihood of whether the frequency of the buffered portion of the input signal transitions from above the carrier frequency to below the carrier frequency, and a fourth correlation circuit configured to output a fourth correlation metric that indicates a likelihood of whether the frequency of the buffered portion of the input signal transitions from below the carrier frequency to above the carrier frequency.

A further aspect of the above embodiment provides that the result combining stage includes: a first adder block coupled to outputs of the first and second correlation circuits and configured to output a difference between the first and second correlation metrics, and a second adder block coupled to outputs of the third and fourth correlation circuits and configured to output a difference between the third and fourth correlation metrics.

Another further aspect of the above embodiment provides that the time combining stage includes: a first delay block coupled to the output of the first adder block, and a second delay block coupled to the output of the second adder block, wherein the input signal encodes a plurality of symbols, each symbol having a symbol duration time, and the first and second delay blocks are configured to delay the outputs of the first and second adder blocks by the symbol duration time.

Another aspect of the above embodiment provides that the time combining stage includes: a first adder block configured to add a first previous correlation result of the set of delayed first correlation results with a first future correlation result of the set of second correlation results to produce a first combined result, and a second adder block configured to add a second previous correlation result of the set of delayed first correlation results with a second future correlation result of the set of second correlation results to produce a second combined result, wherein the first and second previous correlation results each indicate a likelihood of the symbol value being either '0' or '1' based on the first portion of the input signal, and the first and second future correlation results each indicate a likelihood of the symbol value being either '0' or '1' based on the second portion of the input signal.

A further aspect of the above embodiment provides that the time combining stage further includes: a multiplier block configured to scale the second combined result to produce a scaled second combined result, and a third adder block configured to add the first combined result and the scaled second combined result to produce soft data information on which the demodulation decision is based.

Another aspect of the above embodiment provides that the FSK demodulator implements 2-level FSK, the most likely symbol value for the current symbol is '0' when output of the time combining stage is positive, and the most likely symbol value for the current symbol is '1' when the output of the time combining stage is negative.

In another embodiment of the present disclosure, a frequency shift keying (FSK) demodulator for demodulating symbols is provided, which includes: a plurality of correlation circuits, each configured to output a correlation metric that indicates a likelihood of whether a buffered portion of an input signal matches a respective target signal, as the input signal is continuously received by the FSK demodulator; a result combining stage coupled to the plurality of correlation circuits, the result combining stage configured to output a set of first correlation results based on correlation metrics generated for a first portion of the input signal that encodes a current symbol and at least a past symbol, the current symbol received at the FSK demodulator after the past symbol, and output a set of second correlation results based on correlation metrics generated for a second portion of the input signal that encodes the current symbol and at least a next symbol, the next symbol received at the FSK demodulator after the current symbol; and a time combining stage coupled to the result combining stage, the time combining stage configured to delay the set of first correlation results until the set of second correlation results are generated to produce a set of delayed first correlation results, add ones of the set of delayed first correlation results that indicate a likelihood of the current symbol being a first symbol value with ones of the set of second correlation results that indicate a likelihood of the current symbol being the first symbol value to produce a first combined correlation result that indicates an overall likelihood of the current symbol being the first symbol value, add ones of the set of delayed first correlation results that indicate a likelihood of the current symbol being a second symbol value with ones of the set of second correlation results that indicate a likelihood of the current symbol being the second symbol value to produce a second combined correlation result that indicates an overall likelihood of the current symbol being the second symbol value, and output a demodulation decision that returns a most likely symbol value for the current symbol based on magnitudes of the first combined correlation result and the second combined correlation result.

One aspect of the above embodiment provides that the plurality of correlation circuits includes: a first correlation circuit configured to output a first correlation metric that indicates a likelihood of whether the buffered portion of the input signal matches a first target signal encoding a current reference symbol of '0' and a previous reference symbol of '0', a second correlation circuit configured to output a second correlation metric that indicates a likelihood of whether the buffered portion of the input signal matches a second target signal encoding a current reference symbol of '0' and a previous reference symbol of '1', a third correlation circuit configured to output a third correlation metric that indicates a likelihood of whether the buffered portion of the input signal matches a third target signal encoding a current reference symbol of '1' and a previous reference symbol of '0', and a fourth correlation circuit configured to output a fourth correlation metric that indicates a likelihood of whether the buffered portion of the input signal matches a fourth target signal encoding a current reference symbol of '1' and a previous reference symbol of '1'.

A further aspect of the above embodiment provides that the result combining stage further includes: a first maximum block coupled to outputs of the first and second correlation circuits and configured to select one of the first and second correlation metrics having a greatest magnitude and output the selection, a second maximum block coupled to outputs of the first and third correlation circuits and configured to select one of the first and third correlation metrics having a greatest magnitude and output the selection, a third maximum block coupled to outputs of the second and fourth correlation circuits and configured to select one of the second and fourth correlation metrics having a greatest magnitude and output the selection, and a fourth maximum block coupled to outputs of the third and fourth correlation circuits and configured to select one of the third and fourth correlation metrics having a greatest magnitude and output the selection.

Another further aspect of the above embodiment provides that the time combining stage includes: a first delay block coupled to the output of the first maximum block, and a second delay block coupled to the output of the fourth maximum block, wherein the input signal encodes a plurality of symbols, each symbol having a symbol duration time, and the first and second delay blocks are configured to delay the outputs of the first and second maximum blocks by at least the symbol duration time.

Another aspect of the above embodiment provides that the time combining stage includes: a first adder block configured to add a first previous correlation result of the set of delayed first correlation results with a first future correlation result of the set of second correlation results to produce the first combined correlation result, and a second adder block configured to add a second previous correlation result of the set of delayed first correlation results with a second future correlation result of the set of second correlation results to produce the second combined correlation result, wherein the first and second previous correlation results each indicate a likelihood of the current symbol being respectively the first symbol value and the second symbol value based on the first portion of the input signal, and the first and second future correlation results each indicate a likelihood of the current symbol being respectively the first symbol value and the second symbol value based on the second portion of the input signal.

Another aspect of the above embodiment provides that the time combining stage further includes: a maximum block configured to output the first symbol value as the demodulation decision in response to the first combined correlation result having a greatest magnitude, and output the second symbol value as the demodulation decision in response to the second combined correlation result having the greatest magnitude.

Another aspect of the above embodiment provides that the time combining stage further includes: an adder block configured to add a difference between a first future correlation result and a second future correlation result of the set of second correlation results with a difference between a first previous correlation result and a second previous correlation result of the set of delayed first correlation results to output soft data information on which the demodulation decision is based.

Another further aspect of the above embodiment provides that the time combining stage further includes: a third adder block configured to add a third previous correlation result of the set of delayed first correlation results with a third future correlation result of the set of second correlation results to produce a third combined correlation result, and a fourth adder block configured to add a fourth previous correlation result of the set of delayed first correlation results with a fourth future correlation result of the set of second correlation results to produce a fourth combined correlation result, wherein the third and fourth previous correlation results each indicate a likelihood of the current symbol being respectively a third symbol value and a fourth symbol value based on the first portion of the input signal, and the third and fourth future correlation results each indicate a likelihood of the current symbol being respectively the third symbol value and the fourth symbol value based on the second portion of the input signal.

Another further aspect of the above embodiment provides that the time combining stage further includes: a maximum block configured to output the demodulation decision based on one of the first, second, third, and fourth combined correlation results having a greatest magnitude.

Another aspect of the above embodiment provides that the first portion of the input signal further includes at least a second past symbol received at the FSK modulator before the past symbol, the second portion of the input signal further includes at least a second next symbol received at the FSK modulator after the next symbol, the input signal encodes a plurality of symbols, each symbol having a symbol duration time, the time combining stage is configured to delay the set of first correlation results for at least twice the symbol duration time, the first combined correlation result indicates an overall likelihood of the first symbol value as the current symbol based on the first portion of the input signal that encodes the current symbol, the past symbol, and the second past symbol, and the second combined correlation result indicate an overall likelihood of the second symbol value as the current symbol based on the second portion of the input signal that encodes the second next symbol, the next symbol, and the current symbol.

In another embodiment of the present disclosure, a frequency shift keying (FSK) demodulator for demodulating symbols is provided, which includes: a plurality of correlation circuits, each configured to output a complex correlation value that has a magnitude component indicating a likelihood of whether a received portion of an input signal matches a respective target signal, as the input signal is continuously received by the FSK demodulator; a plurality of maximum blocks coupled to the plurality of correlation circuits, including: a first set of maximum blocks configured to output a first set of selected correlation values based on correlation values generated from a first portion of the input signal that encodes the current symbol and at least a past symbol, the current symbol received at the FSK demodulator after the past symbol, and a second set of maximum blocks configured to output a second set of selected correlation values based on correlation values generated from a second portion of the input signal that encodes the current symbol and at least a next symbol, the next symbol received at the FSK demodulator after the current symbol; and a time combining stage coupled to outputs of the plurality of maximum blocks, the time combining stage configured to delay the first set of correlation values until the second set of correlation values are generated to produce a set of delayed correlation values, add ones of the set of delayed correlation values having a squared magnitude component that indicates a likelihood of the current symbol being a first symbol value with ones of the second set of correlation values having a squared magnitude component that indicates a likelihood of the current symbol being the first symbol value to produce a first combined correlation value that indicates an overall likelihood of the current symbol being the first symbol value, add ones of the set of delayed correlation values having a squared magnitude component that indicates a likelihood of the current symbol being a second symbol value with ones of the second set of correlation values having a squared magnitude component that indicates a likelihood of the current symbol being the second symbol value to produce a second combined correlation value that indicates an overall likelihood of the current symbol being the second symbol value, and output a demodulation decision that returns a most likely symbol value for the current symbol based on magnitudes of the first and second combined correlation values.

One aspect of the above embodiment provides that the time combining stage includes: a first adder block configured to use a phase component of a first previous correlation value of the set of delayed correlation values to align a rotation angle of the first previous correlation value with an angle of the current symbol, use a phase component of a first future correlation value of the second set of correlation values to align a rotation angle of the first future correlation value with the angle of the current symbol, and add the aligned first previous and future correlation values to produce the first combined correlation value, and a second adder block configured to use a phase component of a second previous correlation value of the set of delayed correlation values to align a rotation angle of the second previous correlation value with the angle of the current symbol, use a phase component of a second future correlation value of the second set of correlation values to align a rotation angle of the second future correlation value with the angle of the current symbol, and add the aligned second previous and future correlation values to produce the second combined correlation value.

A further aspect of the above embodiment provides that the time combining stage further includes: a first squaring block configured to square the first combined correlation value, a second squaring block configured to square the second combined correlation value, and an adder block configured output a difference between the square of the first combined correlation value and the square of the second combined correlation value as the demodulation decision.

The circuitry described herein may be implemented on a semiconductor substrate, which can be any semiconductor material or combinations of materials, such as gallium arsenide, silicon germanium, silicon-on-insulator (SOI), silicon, monocrystalline silicon, the like, and combinations of the above.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

As used herein the terms "substantial" and "substantially" mean sufficient to accomplish the stated purpose in a practical manner and that minor imperfections, if any, are not significant for the stated purpose.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A frequency shift keying (FSK) demodulator for demodulating symbols comprising:
   a plurality of correlation circuits, each configured to output a correlation metric that indicates a likelihood of whether a frequency of a buffered portion of an input signal matches a respective target frequency behavior pattern, as the input signal is continuously received by the FSK demodulator;
   a result combining stage coupled to the plurality of correlation circuits, the result combining stage configured to
      output a set of first correlation results based on correlation metrics generated for a first portion of the input signal that encodes a current symbol and a past symbol, the current symbol received at the FSK demodulator after the past symbol, and
      output a set of second correlation results based on correlation metrics generated for a second portion of the input signal that encodes the current symbol and a next symbol, the next symbol received at the FSK demodulator after the current symbol; and
   a time combining stage coupled to the result combining stage, the time combining stage configured to
      delay the set of first correlation results until the set of second correlation results are generated to produce a set of delayed first correlation results, and
      combine the set of delayed first correlation results and the set of second correlation results to produce a demodulation decision that returns a most likely symbol value for the current symbol.

2. The FSK demodulator of claim 1, wherein the plurality of correlation circuits comprises:
   a first correlation circuit configured to output a first correlation metric that indicates a likelihood of whether the frequency of the buffered portion of the input signal remains greater than a carrier frequency,
   a second correlation circuit configured to output a second correlation metric that indicates a likelihood of whether the frequency of the buffered portion of the input signal remains less than the carrier frequency,
   a third correlation circuit configured to output a third correlation metric that indicates a likelihood of whether the frequency of the buffered portion of the input signal transitions from above the carrier frequency to below the carrier frequency, and
   a fourth correlation circuit configured to output a fourth correlation metric that indicates a likelihood of whether the frequency of the buffered portion of the input signal transitions from below the carrier frequency to above the carrier frequency.

3. The FSK demodulator of claim 2, wherein the result combining stage comprises:
   a first adder block coupled to outputs of the first and second correlation circuits and configured to output a difference between the first and second correlation metrics, and
   a second adder block coupled to outputs of the third and fourth correlation circuits and configured to output a difference between the third and fourth correlation metrics.

4. The FSK demodulator of claim 3, wherein the time combining stage comprises:
   a first delay block coupled to the output of the first adder block, and
   a second delay block coupled to the output of the second adder block, wherein
   the input signal encodes a plurality of symbols, each symbol having a symbol duration time, and
   the first and second delay blocks are configured to delay the outputs of the first and second adder blocks by the symbol duration time.

5. The FSK demodulator of claim 1, wherein the time combining stage comprises:
   a first adder block configured to add a first previous correlation result of the set of delayed first correlation results with a first future correlation result of the set of second correlation results to produce a first combined result, and
   a second adder block configured to add a second previous correlation result of the set of delayed first correlation results with a second future correlation result of the set of second correlation results to produce a second combined result, wherein
      the first and second previous correlation results each indicate a likelihood of the symbol value being either '0' or '1' based on the first portion of the input signal, and
      the first and second future correlation results each indicate a likelihood of the symbol value being either '0' or '1' based on the second portion of the input signal.

6. The FSK demodulator of claim 5, wherein the time combining stage further comprises:
   a multiplier block configured to scale the second combined result to produce a scaled second combined result, and
   a third adder block configured to add the first combined result and the scaled second combined result to produce soft data information on which the demodulation decision is based.

7. The FSK demodulator of claim 1, wherein the FSK demodulator implements 2-level FSK, the most likely symbol value for the current symbol is '0' when output of the time combining stage is positive, and the most likely symbol value for the current symbol is '1' when the output of the time combining stage is negative.

8. A frequency shift keying (FSK) demodulator for demodulating symbols comprising:
   a plurality of correlation circuits, each configured to output a correlation metric that indicates a likelihood of whether a buffered portion of an input signal matches a respective target signal, as the input signal is continuously received by the FSK demodulator;
a result combining stage coupled to the plurality of correlation circuits, the result combining stage configured to
output a set of first correlation results based on correlation metrics generated for a first portion of the input signal that encodes a current symbol and at least a past symbol, the current symbol received at the FSK demodulator after the past symbol, and
output a set of second correlation results based on correlation metrics generated for a second portion of the input signal that encodes the current symbol and at least a next symbol, the next symbol received at the FSK demodulator after the current symbol; and
a time combining stage coupled to the result combining stage, the time combining stage configured to
delay the set of first correlation results until the set of second correlation results are generated to produce a set of delayed first correlation results,
add ones of the set of delayed first correlation results that indicate a likelihood of the current symbol being a first symbol value with ones of the set of second correlation results that indicate a likelihood of the current symbol being the first symbol value to produce a first combined correlation result that indicates an overall likelihood of the current symbol being the first symbol value,
add ones of the set of delayed first correlation results that indicate a likelihood of the current symbol being a second symbol value with ones of the set of second correlation results that indicate a likelihood of the current symbol being the second symbol value to produce a second combined correlation result that indicates an overall likelihood of the current symbol being the second symbol value, and
output a demodulation decision that returns a most likely symbol value for the current symbol based on magnitudes of the first combined correlation result and the second combined correlation result.

9. The FSK demodulator of claim 8, wherein the plurality of correlation circuits comprises:
a first correlation circuit configured to output a first correlation metric that indicates a likelihood of whether the buffered portion of the input signal matches a first target signal encoding a current reference symbol of '0' and a previous reference symbol of '0',
a second correlation circuit configured to output a second correlation metric that indicates a likelihood of whether the buffered portion of the input signal matches a second target signal encoding a current reference symbol of '0' and a previous reference symbol of '1',
a third correlation circuit configured to output a third correlation metric that indicates a likelihood of whether the buffered portion of the input signal matches a third target signal encoding a current reference symbol of '1' and a previous reference symbol of '0', and
a fourth correlation circuit configured to output a fourth correlation metric that indicates a likelihood of whether the buffered portion of the input signal matches a fourth target signal encoding a current reference symbol of '1' and a previous reference symbol of '1'.

10. The FSK demodulator of claim 9, wherein the result combining stage further comprises:
a first maximum block coupled to outputs of the first and second correlation circuits and configured to select one of the first and second correlation metrics having a greatest magnitude and output the selection,
a second maximum block coupled to outputs of the first and third correlation circuits and configured to select one of the first and third correlation metrics having a greatest magnitude and output the selection,
a third maximum block coupled to outputs of the second and fourth correlation circuits and configured to select one of the second and fourth correlation metrics having a greatest magnitude and output the selection, and
a fourth maximum block coupled to outputs of the third and fourth correlation circuits and configured to select one of the third and fourth correlation metrics having a greatest magnitude and output the selection.

11. The FSK demodulator of claim 10, wherein the time combining stage comprises:
a first delay block coupled to the output of the first maximum block, and
a second delay block coupled to the output of the fourth maximum block, wherein
the input signal encodes a plurality of symbols, each symbol having a symbol duration time, and
the first and second delay blocks are configured to delay the outputs of the first and second maximum blocks by at least the symbol duration time.

12. The FSK demodulator of claim 8, wherein the time combining stage comprises:
a first adder block configured to add a first previous correlation result of the set of delayed first correlation results with a first future correlation result of the set of second correlation results to produce the first combined correlation result, and
a second adder block configured to add a second previous correlation result of the set of delayed first correlation results with a second future correlation result of the set of second correlation results to produce the second combined correlation result, wherein
the first and second previous correlation results each indicate a likelihood of the current symbol being respectively the first symbol value and the second symbol value based on the first portion of the input signal, and
the first and second future correlation results each indicate a likelihood of the current symbol being respectively the first symbol value and the second symbol value based on the second portion of the input signal.

13. The FSK demodulator of claim 8, wherein the time combining stage further comprises:
a maximum block configured to
output the first symbol value as the demodulation decision in response to the first combined correlation result having a greatest magnitude, and
output the second symbol value as the demodulation decision in response to the second combined correlation result having the greatest magnitude.

14. The FSK demodulator of claim 8, wherein the time combining stage further comprises:
an adder block configured to add a difference between a first future correlation result and a second future correlation result of the set of second correlation results with a difference between a first previous correlation result and a second previous correlation result of the set of delayed first correlation results to output soft data information on which the demodulation decision is based.

15. The FSK demodulator of claim 12, wherein the time combining stage further comprises:
- a third adder block configured to add a third previous correlation result of the set of delayed first correlation results with a third future correlation result of the set of second correlation results to produce a third combined correlation result, and
- a fourth adder block configured to add a fourth previous correlation result of the set of delayed first correlation results with a fourth future correlation result of the set of second correlation results to produce a fourth combined correlation result, wherein
  - the third and fourth previous correlation results each indicate a likelihood of the current symbol being respectively a third symbol value and a fourth symbol value based on the first portion of the input signal, and
  - the third and fourth future correlation results each indicate a likelihood of the current symbol being respectively the third symbol value and the fourth symbol value based on the second portion of the input signal.

16. The FSK demodulator of claim 15, wherein the time combining stage further comprises:
- a maximum block configured to output the demodulation decision based on one of the first, second, third, and fourth combined correlation results having a greatest magnitude.

17. The FSK demodulator of claim 8, wherein
- the first portion of the input signal further comprises at least a second past symbol received at the FSK modulator before the past symbol,
- the second portion of the input signal further comprises at least a second next symbol received at the FSK modulator after the next symbol,
- the input signal encodes a plurality of symbols, each symbol having a symbol duration time,
- the time combining stage is configured to delay the set of first correlation results for at least twice the symbol duration time,
- the first combined correlation result indicates an overall likelihood of the first symbol value as the current symbol based on the first portion of the input signal that encodes the current symbol, the past symbol, and the second past symbol, and
- the second combined correlation result indicate an overall likelihood of the second symbol value as the current symbol based on the second portion of the input signal that encodes the second next symbol, the next symbol, and the current symbol.

18. A frequency shift keying (FSK) demodulator for demodulating symbols comprising:
- a plurality of correlation circuits, each configured to output a complex correlation value that has a magnitude component indicating a likelihood of whether a received portion of an input signal matches a respective target signal, as the input signal is continuously received by the FSK demodulator;
- a plurality of maximum blocks coupled to the plurality of correlation circuits, comprising:
  - a first set of maximum blocks configured to output a first set of selected correlation values based on correlation values generated from a first portion of the input signal that encodes the current symbol and at least a past symbol, the current symbol received at the FSK demodulator after the past symbol, and
  - a second set of maximum blocks configured to output a second set of selected correlation values based on correlation values generated from a second portion of the input signal that encodes the current symbol and at least a next symbol, the next symbol received at the FSK demodulator after the current symbol; and
- a time combining stage coupled to outputs of the plurality of maximum blocks, the time combining stage configured to
  - delay the first set of correlation values until the second set of correlation values are generated to produce a set of delayed correlation values,
  - add ones of the set of delayed correlation values having a squared magnitude component that indicates a likelihood of the current symbol being a first symbol value with ones of the second set of correlation values having a squared magnitude component that indicates a likelihood of the current symbol being the first symbol value to produce a first combined correlation value that indicates an overall likelihood of the current symbol being the first symbol value,
  - add ones of the set of delayed correlation values having a squared magnitude component that indicates a likelihood of the current symbol being a second symbol value with ones of the second set of correlation values having a squared magnitude component that indicates a likelihood of the current symbol being the second symbol value to produce a second combined correlation value that indicates an overall likelihood of the current symbol being the second symbol value, and
  - output a demodulation decision that returns a most likely symbol value for the current symbol based on magnitudes of the first and second combined correlation values.

19. The FSK demodulator of claim 18, wherein the time combining stage comprises:
- a first adder block configured to
  - use a phase component of a first previous correlation value of the set of delayed correlation values to align a rotation angle of the first previous correlation value with an angle of the current symbol,
  - use a phase component of a first future correlation value of the second set of correlation values to align a rotation angle of the first future correlation value with the angle of the current symbol, and
  - add the aligned first previous and future correlation values to produce the first combined correlation value, and
- a second adder block configured to
  - use a phase component of a second previous correlation value of the set of delayed correlation values to align a rotation angle of the second previous correlation value with the angle of the current symbol,
  - use a phase component of a second future correlation value of the second set of correlation values to align a rotation angle of the second future correlation value with the angle of the current symbol, and
  - add the aligned second previous and future correlation values to produce the second combined correlation value.

20. The FSK demodulator of claim 19, wherein the time combining stage further comprises:
- a first squaring block configured to square the first combined correlation value,
- a second squaring block configured to square the second combined correlation value, and an adder block configured output a difference between the square of the first combined correlation value and the square of the second combined correlation value as the demodulation decision.

* * * * *